US008222356B2

(12) United States Patent
Kipke et al.

(10) Patent No.: US 8,222,356 B2
(45) Date of Patent: Jul. 17, 2012

(54) PROCESS FOR PREPARING ETHYLENE COPOLYMERS

(75) Inventors: Jennifer Kipke, Frankfurt (DE); Shahram Mihan, Bad Soden (DE); Rainer Karer, Kaiserslautern (DE); Dieter Lilge, Limburgerhof (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 13/187,963

(22) Filed: Jul. 21, 2011

(65) Prior Publication Data

US 2011/0282012 A1    Nov. 17, 2011

Related U.S. Application Data

(62) Division of application No. 11/578,733, filed as application No. PCT/EP2005/004406 on Apr. 25, 2005, now Pat. No. 8,008,403.

(60) Provisional application No. 60/587,533, filed on Jul. 13, 2004.

(30) Foreign Application Priority Data

Apr. 26, 2004    (DE) .................. 10 2004 020 524

(51) Int. Cl.
C08F 10/02    (2006.01)
C08F 4/64    (2006.01)
C08F 4/70    (2006.01)

(52) U.S. Cl. ..... 526/115; 526/117; 526/348; 526/348.6; 526/160

(58) Field of Classification Search ............. 526/115, 526/117
See application file for complete search history.

(56) References Cited

U.S. PATENT DOCUMENTS

| 3,125,547 | A | 3/1964 | Blatz |
| 3,242,150 | A | 3/1966 | Scoggin |
| 3,248,179 | A | 4/1966 | Norwood |
| 4,438,238 | A | 3/1984 | Fukushima et al. |
| 5,350,807 | A | 9/1994 | Pettijohn |
| 5,565,534 | A | 10/1996 | Aulbach |
| 5,710,297 | A | 1/1998 | Weller et al. |
| 5,770,753 | A | 6/1998 | Kuber et al. |
| 5,786,432 | A | 7/1998 | Kuber et al. |
| 5,840,644 | A | 11/1998 | Kuber et al. |
| 5,840,948 | A | 11/1998 | Rohrmann et al. |
| 5,852,142 | A | 12/1998 | Rohrmann et al. |
| 5,929,264 | A | 7/1999 | Rohrmann et al. |
| 5,990,254 | A | 11/1999 | Weller et al. |
| 6,051,522 | A | 4/2000 | Rohrmann et al. |
| 6,051,727 | A | 4/2000 | Kuber et al. |
| 6,242,544 | B1 | 6/2001 | Kuber et al. |
| 6,255,506 | B1 | 7/2001 | Kuber et al. |
| 6,417,302 | B1 | 7/2002 | Bohnen |
| 6,465,386 | B1 * | 10/2002 | Maddox et al. ............ 502/155 |
| 6,812,185 | B2 | 11/2004 | Fischer et al. |
| 7,053,160 | B1 | 5/2006 | Bingel et al. |
| 7,666,959 | B2 * | 2/2010 | Razavi ........................ 526/115 |
| 7,723,448 | B2 | 5/2010 | Mihan et al. |
| 7,767,613 | B2 | 8/2010 | Mihan |
| 2003/0125195 | A1 | 7/2003 | Britovsek et al. |
| 2004/0054088 | A1 | 3/2004 | Kazakov et al. |

FOREIGN PATENT DOCUMENTS

| EP | 0100843 | 2/1984 |
| EP | 0129368 | 12/1984 |
| EP | 0416815 | 3/1991 |
| EP | 0533154 | 3/1993 |
| EP | 0533155 | 3/1993 |
| EP | 0533156 | 3/1993 |
| EP | 0533160 | 3/1993 |
| EP | 0545304 | 6/1993 |
| EP | 0561479 | 9/1993 |
| EP | 0576970 | 1/1994 |
| EP | 0576970 | 1/1995 |
| EP | 0632063 | 1/1995 |
| EP | 0632063 | 4/1995 |
| EP | 0659758 | 6/1995 |
| EP | 0661300 | 7/1995 |
| WO | WO-91/09882 | 7/1991 |
| WO | WO-95/11264 | 4/1995 |
| WO | WO-96/00243 | 1/1996 |
| WO | WO-97/04015 | 2/1997 |
| WO | WO-97/36937 | 10/1997 |
| WO | WO-98/27124 | 6/1998 |
| WO | WO-98/40419 | 9/1998 |
| WO | WO-99/06414 | 2/1999 |
| WO | WO-99/46302 | 9/1999 |
| WO | WO 99/46302 * | 9/1999 |
| WO | WO-9946302 | 9/1999 |
| WO | WO-99/50318 | 10/1999 |

(Continued)

OTHER PUBLICATIONS

Chen, Y. et al., "Halogen-Substituted 2,6-Bis(imino)pyridyl Iron and Cobalt Complexes: Highly Active Catalysts for Polymerization and Oligomerization of Ethylene", Organometallics vol. 22(21) 2003 , 4312-4321.
Small, Brooke L. et al., "Highly Active Iron and Cobalt Catalysts for the Polymerization of Ethylene", J.Am. Chem. Soc. 1998 , 4049-4050.
Britovsek, G. et al., "Novel Olefin Polymerization Catalysts based on Iron and Cobalt", Chem. Commun. 1998 , 849-850.
Ratzsch, M. et al., "Biomodal Polymer Materials Based on PP and PE", VDI-Verlag, Dusseldorf 1995 , 3-25.
Pang, S. et al., "Chapter 17—Size-Exclusion Chromatographic Assessment of Long-Chain Branch Frequency in Polyethylenes", American Chemical Society edited by Theodore Provder; ACS Symposium Series 521 (Chromatography of Polymers) 1993 , 254-269.
Strauss, Steven H. , "The Search for Larger and More Weakly Coordinating Anions", Chem. Rev. vol. 93(3) 1993 , 927-942.
"Ullman's Encyclopedia of Industrial Chemistry", vol. A21, 4th Edition 1992 , 502-504.

(Continued)

Primary Examiner — Roberto Rabago
(74) Attorney, Agent, or Firm — Dilworth IP LLC

(57) ABSTRACT

A process for preparing polyethylene which comprises ethylene homopolymers and/or copolymers of ethylene with 1-alkenes and has a molar mass distribution width $M_w/M_n$ of from 5 to 30, a density of from 0.92 to 0.955 g/cm$^3$, a weight average molar mass $M_w$ of from 50000 g/mol to 500 000 g/mol and has from 0.01 to 20 branches/1000 carbon atoms and a z-average molar mass $M_z$ of less than 1 million g/mol.

3 Claims, No Drawings

FOREIGN PATENT DOCUMENTS

| | | |
|---|---|---|
| WO | WO-00/05277 | 2/2000 |
| WO | WO-00/24787 | 5/2000 |
| WO | WO-00/31090 | 6/2000 |
| WO | WO-00/68279 | 11/2000 |
| WO | WO-01/25328 | 4/2001 |
| WO | WO-01/41920 | 6/2001 |

OTHER PUBLICATIONS

Randall, J., "A Review of High Resolution Liquid (13) Carbon Nuclear Magnetic Resonance Characterizations of Ethylene-Based Polymers", JMS-Rev. Macromol. Chem. Phys. C29 (2&3) 1989, 201-317.

Wiesenfeldt, Helga, "ansa-Metallocene derivatives; XVII. Racemic and meso diastereomers of group IV metallocene derivatives with symmetrically substituted dimethylsilanediyl-bridged ligand frameworks. Crystal structure of R,S-Me2SI(3-1-Bu-5-MeC5H2)2ZrCl2", Journal of Organometallic Chemistry, 369 Elsevier Sequoia S.A., Lausanne—Printed in the Netherlands 1989, 359-370.

Starzweski, K. O. et al., "Linear and Branched Polyethylenes by new Coordination Catalysts", Transition Metals and Organometallics as Catalysts for Olefin Polymerization Springer-Verlag Berlin Heidelberg 1988, 349-360.

Hermann, C. et al., "Beeinflussung von titanhaltigen Polymerisations-katalysatoren durch zusatzliche Metalle", Die Angewandte Makromolekulare Chemie 94 1981, 91-104.

Raff and Doak, "High Polymers", Interscience Publishers, John Wiley & Sons Vo. XX 1965, 442-443.

Fieser, Louis et al., "Textbook of Organic Chemistry, Third Revised Edition", Verlag Chemie-GmbH, Weinheim/Bergstr. 1957 1957, 10 pages.

Burkhardt, U., "Preparation of Polymers Having New Properties", Conference Baden-Baden Nov. 29-30, 1995/VDI-Gesellschaft Kunststofftechnik (Plastics Technology) Dusseldorf: VDI-VER1., 1995, ISBN 3-18-234191-X Aufbereiten von Polymeren mit neuartigen Eigenschaften Nov. 29, 1995, 3 pages.

Chen, Y. et al., "Halogen-Substituted 2,6-Bis(imino)pyridyl Iron and Cobalt Complexes: Highly Active Catalysts for Polymerization and Oligomerization of Ethylene". Organometallics vol. 22(21) 2003, 4312-4321.

Small, Brooke L. et al., "Highly Active Iron and Cobalt Catalysts for the Polymerization of Ethylene". J.Am. Chem. Soc. 1998, 4049-4050.

Britovsek, G. at al., "Novel Olefin Polymerization Catalysts based on Iron and Cobalt", Chem. Commun. 1998, 849-850.

Ratzsch, M. et al., "Biomodal Polymer Materials Based On PP and PE", VDI-Verlag, Dusseldorf 1995, 3-25.

Pang, S. et al., "Chapter 17—Size-Exclusion Chromatographic Assessment of Long-Chain Branch Frequency in Polyethylenes", Assessment of Chemical Society edited by Theodore Provder; ACS Symposium Series 521 (Chromatography of Polymers) 1993, 254-269.

Strauss, Steven H., "The Search for Larger and More Weakly Coordinating Anions", Chem. Rev. vol. 93(3) 1993, 927-942.

Bohm, Ludwig L. et al., "High-Density Polyethylene Pipe Resins", Advanced Materials 4 No. 3 1992, 234-238.

"Ullman's Encyclopedia of Industrial Chemistry", vol. A21, 4th Edition 1992, 502-504.

Randall, J., "A Review of High Resolution Liquid (13) Carbon Nuclear Magnetic Resonance Characterizations of Ethylene-Based Polymers", JMS-Rev. Macromol. Chem. Phys. C29 (2&3) 1989, 201-317.

Wiesenfeldt, Helga, "ansa-Metallocene derivatives; XVII. Racemic and meso diastereomers of group IV metallocene derivates with symmetrucakky substituted dimethylsilanediyl-bridged ligan frameworks. Crystal structure of R,S-Me2SI93-1-Bu-5-MeC5H2)2ZrCI2", Journal of Organometallic Chemistry, 369 Elsevier Sequoi S.A., Lausanne—Printed in the Netherlands 1989, 359-370.

Starzweski, K. O. at al.. "Linear and Branched Polyethylenes by new Coordination Catalysts", Transition Metals and Organometallics as Catalysts for Olefin Polymerization Springer-Verlag Berlin Heidelberg 1998, 349-360.

Beach, D. et al., "Dual Functional Catalysis for Ethylene Polymerization to Branched Polyethylene. I Evaluation of Catalytic Systems", Journal of Polymer Science: Polymer Chemistry Edition vol. 22 1984, 3027-3042.

Hermann, C. et al., "Beeinflussung von titanhaltigen Polymerisations-katalysatoren durch zusatzliche Metalle", Die Angewandte Makromolekulare Chemie 94 1981, 91-104.

Holtrup, Wolfgang, "Zur Fraktionierung von Polymeren durch Direktextraktion", Makromol. Chem. 178 1977, 2335-2349.

Raff and Doak, "High Polymers", Interscience Publishers, John Wiley & Sons Vo. XX 1965, 442-443.

Fieser, Louis et al., "Textbook of Organic Chemistry, Third Revised Edition", Verlag Chemie-GmbH, Weinheim/Bergstr. 1957 1957, 10 pages.

Burkhardt. U., "Preparation of Polymers Having New Properties", Conference Baden-Baden Nov. 29-30, 1995/VDIGesellschaft Kunststofftechnik (Plastics Technology) Dusseldorf: VDI-VERI., 1995, ISBN 3-18-234191-X Aufbereiten von Polymeren mit neuartigen Eigenschaften Nov. 29, 1995, 3 pages.

\* cited by examiner

PROCESS FOR PREPARING ETHYLENE COPOLYMERS

CROSS-REFERENCE TO RELATED APPLICATIONS

This application is a divisional of application Ser. No. 11/578,733, filed Jul. 2, 2007, now U.S. Pat. No. 8,008,403, which is a national phase filing of International Application PCT/EP2005/004406, filed Apr. 25, 2005, claiming priority to German Patent Application 102004020524.8 filed Apr. 26, 2004, and the benefit under 35 U.S.C. 119(e) of U.S. Provisional Application No. 60/587,533, filed Jul. 13, 2004; the disclosures of application Ser. No. 11/578,733, International Application PCT/EP2005/004406, German Patent Application 102004020524.8 and U.S. Provisional Application No. 60/587,533, each as filed, are incorporated herein by reference.

DESCRIPTION

The present invention relates to a novel polyethylene, a catalyst composition and a process for its preparation, and also to fibers, moldings, films or polymer mixtures in which this polyethylene is present.

Ever higher demands are made of the mechanical strength of films comprising polyethylene. In particular, products having a high stress cracking resistance, impact toughness and stiffness which are particularly suitable for the production of films for food packaging, are required. The requirement of simultaneously good stress cracking resistance and stiffness is not easy to meet, since these properties run counter to one another. While the stiffness increases with increasing density of the polyethylene, the stress cracking resistance decreases with increasing density.

Stress crack formation in plastics is a physicochemical process which does not change the polymer molecules. It is caused, inter alia, by gradual yielding or untangling of the connecting molecular chains. Stress crack formation occurs less readily the higher the mean molecular weight, the broader the molecular weight distribution and the higher the degree of molecular branching, i.e. the lower the densities. It occurs less readily the longer the side chains themselves. Surface-active substances, in particular soaps, and thermal stress accelerate stress crack formation. On the other hand optical properties, like transparency generally decrease with increasing density.

The properties of bimodal polyethylenes depend, firstly, on the properties of the components present. Secondly, the quality of mixing of the high molecular weight component and the low molecular weight component is of particular importance for the mechanical properties of the polyethylene. A poor mixing quality results, inter alia, in a low stress cracking resistance and adversely affects the creep behavior of pressure pipes made of polyethylene blends.

It has been found to be advantageous to use blends of a high molecular weight, low-density ethylene copolymer and a low molecular weight, high-density ethylene homopolymer, which have good stress cracking resistances, for hollow bodies and pressure pipes, as described, for example, by L. L. Böhm et al., Adv. Mater. 4, 234-238 (1992). Similar polyethylene blends are disclosed in EP-A-100 843, EP-A 533 154, EP-A 533 155, EP-A 533 156, EP-A 533 160 and U.S. Pat. No. 5,350,807.

Such bimodal polyethylene blends are often produced using reactor cascades, i.e. two or more polymerization reactors are connected in series, and the polymerization of the low molecular weight component occurs in one reactor and that of the high molecular weight component occurs in the next (cf. for example, M. Rätzsch, W. Neiβl "Bimodale Polymerwerkstoffe auf der Basis von PP and PE" in "Aufbereiten von Polymeren mit neuartigen Eigenschaften", pp. 3-25, VDI-Verlag, Düsseldorf 1995). A disadvantage of this process is that relatively large amounts of hydrogen have to be added to produce the low molecular weight component. The polymers obtained in this way therefore have a low content of vinyl end groups, especially in the low molecular weight component. In addition, it is technically complex to prevent comonomers added in one reactor or hydrogen added as regulator from getting into the next reactor.

The use of catalyst compositions comprising two or more different olefin polymerization catalysts of the Ziegler type or the metallocene type is known. For example, it is possible to use a combination of two catalysts of which one produces a polyethylene having a mean molar mass which is different from that produced by the other for preparing reactor blends having broad molecular weight distributions (WO 95/11264). The copolymers of ethylene with higher α-olefins such as propene, 1-butene, 1-pentene, 1-hexene or 1-octene, known as LLDPE (linear low density polyethylene) which are formed using classical Ziegler-Natta catalysts based on titanium are different from an LLDPE which is prepared using a metallocene. The number of side chains formed by incorporation of the comonomer and their distribution, known as the SCBD (short chain branching distribution) is very different when using the various catalyst systems. The number and distribution of the side chains has a critical influence on the crystallization behavior of the ethylene copolymers. While the flow properties and thus the processability of these ethylene copolymers depends mainly on their molar mass and molar mass distribution, the mechanical properties are therefore particularly dependent on the short chain branching distribution. However, the short chain branching distribution also plays a role in particular processing methods, e.g. in film extrusion in which the crystallization behavior of the ethylene copolymers during cooling of the film extrudate is an important factor in determining how quickly and in what quality a film can be extruded. The correct combination of catalysts for a balanced combination of catalysts for a balanced combination of good mechanical properties and good processability is difficult to find in view of the large number of possible combinations.

The addition of metal components, including late transition metals, to olefin polymerization catalysts based on early transition metals to increase the activity or stability of the latter catalysts has been described many times (Herrmann, C.; Streck, R.; Angew. Makromol. Chem. 94 (1981) 91-104).

The synthesis of branched polymers from ethylene without use of a comonomer using bimetallic catalysts in which one catalyst oligomerizes part of the ethylene and the other copolymerizes the oligomers formed in this way with ethylene has been described (Beach, David L.; Kissin, Yury V.; J. Polym. Sci., Polym. Chem. Ed. (1984), 22, 3027-42. Ostoja-Starzewski, K. A.; Witte, J.; Reichert, K. H., Vasiliou, G. in Transition Metals and Organometallics as Catalysts for Olefin Polymerization. Kaminsky, W.; Sinn, H. (editors); Springer-Verlag; Heidelberg; 1988; pp. 349-360). The latter reference describes, for example, the use of a nickel-containing oligomerization catalyst in combination with a chromium-containing polymerization catalyst.

WO 99/46302 describes a catalyst composition based on (a) an iron-pyridinebisimine component and (b) a further catalyst such as a zirconocene or Ziegler catalyst and their use for the polymerization of ethylene and olefins.

Another important variable in film processing is the bubble shape. A lot of film properties can be still further improved by switching from the "conventional" method, wherein the bubble is intensively cooled immediately after leaving the die, to the so called "long stalk" method. In the later method the upper lip of the cooling ring is adjusted to give a large air outlet gap. As a result the cooling air velocity is lower than with the conventional method, even as the fan output remains the same. The static pressure around the bubble remains relatively high. It prevents expansion and thus leads to the formation of a stalk. Due to the comparatively small cooling surface, the temperature of the stalk remains high and the orientations of the polymers resulting from the flow in the die are partially relaxed. The frost line hight remains unchanged. The bubble is inflated uniformly and simultaneously in machine and transverse direction under intensive cooling immediately before it reaches the frost line. This usually improves mechanical properties of the film. On the other hand it is not possible in all extrusion lines to adjust the upper cooling lip and thus the bubble shape.

The known ethylene copolymer blends still leave something to be desired in terms of the combination of good mechanical properties, good processability and high optical qualities. It is further desirable to have films which have similar properties independently from the mode of extrusion by either the "conventional" or the "long stalk" method.

It has surprisingly been found that this object can be achieved using a specific catalyst composition by means of which a polyethylene having good mechanical properties, good processability and high optical qualities is obtained We have accordingly found a polyethylene which comprises ethylene homopolymers and/or copolymers of ethylene with 1-alkenes and has a molar mass distribution width $M_w/M_n$ of from 5 to 30, a density of from 0.92 to 0.955 g/cm$^3$, a weight average molar mass $M_w$ of from 50000 g/mol to 500 000 g/mol and has from 0.01 to 20 branches/1000 carbon atoms and a z-average molar mass Mz of less than 1 million g/mol.

The polyethylene of the invention has a molar mass distribution width $M_w/M_n$ in the range from 5 to 30, preferably from 6 to 20 and particularly preferably from 7 to 15. The density of the polyethylene of the invention is in the range from 0.92 to 0.955 g/cm$^3$, preferably from 0.93 to 0.95 g/cm$^3$ and particularly preferably in the range from 0.935 to 0.945 g/cm$^3$. The weight average molar mass $M_w$ of the polyethylene of the invention is in the range from 50000 g/mol to 500 000 g/mol, preferably from 100 000 g/mol to 300 000 g/mol and particularly preferably from 120 000 g/mol to 250 000 g/mol.

The molar mass distribution of the polyethylene of the invention can be monomodal, bimodal or multimodal. In the present patent application, a monomodal molar mass distribution means that the molar mass distribution has a single maximum. A bimodal molar mass distribution means, for the purposes of the present patent application, that the molar mass distribution has at least two points of inflection on one flank starting from a maximum. The molar mass distribution is preferably monomodal or bimodal, in particular bimodal.

The polyethylene of the invention has from 0.01 to 20 branches/1000 carbon atoms, preferably from 1 to 10 branches/1000 carbon atoms and particularly preferably from 3 to 8 branches/1000 carbon atoms. The branches/1000 carbon atoms are determined by means of $^{13}$C-NMR, as described by James. C. Randall, JMS-REV. Macromol. Chem. Phys., C29 (2&3), 201-317 (1989), and refer to the total content of CH$_3$ groups/1000 carbon atoms.

The z-average molar mass $M_z$ of the polyethylene of the invention is in the range of less than 1 million g/mol, preferably from 250 000 g/mol to 700 000 g/mol and particularly preferably from 300 000 g/mol to 500 000 g/mol. The definition of z-average molar mass $M_z$ is e.g. published in High Polymers Vol. XX, Raff and Doak, Interscience Publishers, John Wiley & Sons, 1965, S. 443.

The HLMI of the polyethylene of the invention is preferably in the range of from 5 to 100 g/10 min, preferably in the range of from 7 to 60 g/10 min and particularly preferably of from 9 to 50 g/10 min. For the purposes of this invention, the expression "HLMI" refers as known to the "high load melt index" and is determined at 190° C. under a load of 21.6 kg (190° C./21.6 kg) in accordance with ISO 1133.

The amount of the polyethylene of the invention with a molar mass of below 1 million g/mol, as determined by GPC, in the standard determination of the molecular weight distribution, is preferably above 95.5% by weight, preferably above 96% by weight and particularly preferably above 97% by weight. This is determined in the usual course of the molar mass distribution measurement by applying the WIN GPC software.

The polyethylene of the invention has preferably at least 0.5 vinyl groups/1000 carbon atoms, preferably from 0.6 to 3 vinyl groups/1000 carbon atoms and particularly preferably from 0.7 to 2 vinyl groups/1000 carbon atoms. The content of vinyl groups/1000 carbon atoms is determined by means of IR, ASTM D 6248-98. For the present purposes, the expression vinyl groups refers to —CH=CH$_2$ groups; vinylidene groups and internal olefinic groups are not encompassed by this expression. Vinyl groups are usually attributed to a polymer termination reaction after an ethylene insertion, while vinylidene end groups are usually formed after a polymer termination reaction after a comonomer insertion. Vinylidene and vinyl groups can subsequently be functionalized or crosslinked, with vinyl groups usually being more suitable for these subsequent reactions. Preference is given to at least 0.5 vinyl groups/1000 carbon atoms, preferably from 0.5 to 10 vinyl groups/1000 carbon atoms and particularly preferably from 0.7 to 5 vinyl groups/1000 carbon atoms being present in the 20% by weight of the polyethylene having the lowest molar masses. This can be determined by solvent-nonsolvent fractionation, later called Holtrup fractionation as described in W. Holtrup, Makromol. Chem. 178, 2335 (1977) coupled with IR measurement of the different fractions, with the vinyl groups being measured in accordance with ASTM D 6248-98. Xylene and ethylene glycol diethyl ether at 130° C. were used as solvents for the fractionation. 5 g of polyethylene were used and were divided into 8 fractions.

The polyethylene of the invention preferably has at least 0.05 vinylidene groups/1000 carbon atoms, in particular from 0.1 to 1 vinylidene groups/1000 carbon atoms and particularly preferably from 0.14 to 0.4 vinylidene groups/1000 carbon atoms. The determination is carried out in accordance with ASTM D 6248-98.

Preferably the 5-50% by weight of the polyethylene of the invention having the lowest molar masses, preferably 10-40% by weight and particularly preferably 15-30% by weight, have a degree of branching of less than 12 branches/1000 carbon atoms. This degree of branching in the part of the polyethylene having the lowest molar masses is preferably from 0.01 to 10 branches/1000 carbon atoms and particularly preferably from 0.1 to 6 branches/1000 carbon atoms. The 5-50% by weight of the polyethylene of the invention having the highest molar masses, preferably 10-40% by weight and particularly preferably 15-30% by weight, have a degree of branching of more than 1 branch/1000 carbon atoms. This degree of branching in the part of the polyethylene having the highest molar masses is preferably from 2 to 40 branches/1000 carbon atoms and particularly preferably from 5 to 20 branches/1000 carbon atoms. The part of the polyethylene having the lowest or highest molar mass is determined by the method of solvent-nonsolvent fractionation, later called Holtrup fractionation as described in W. Holtrup, Makromol. Chem. 178, 2335 (1977) and coupled with IR or NMR analysis of the different fractions. Xylene and ethylene glycol diethyl ether at 130° C. were used as solvents and nonsolvent for the fractionation. 5 g of polyethylene were used and were divided into 8 fractions. The fractions are subsequently examined by $^{13}$C-NMR spectroscopy. The degree of branching in the various polymer fractions can be determined by means of $^{13}$C-NMR as described by James. C. Randall, JMS-REV. Macromol. Chem. Phys., C29 (2&3), 201-317 (1989). The degree of branching is the total $CH_3$ content/1000 carbon atoms in the low or high molecular weight fractions.

The polyethylene of the invention preferably has from 0.1 to 20 branches of side chains larger than $CH_3$/1000 carbon atoms, preferably side chains from $C_2$-$C_6$/1000 carbon atoms, preferably from 1 to 10 branches of side chains larger than $CH_3$/1000 carbon atoms, preferably side chains from $C_2$-$C_6$/1000 carbon atoms and particularly preferably from 2 to 6 branches of side chains larger than $CH_3$/1000 carbon atoms, preferably side chains from $C_2$-$C_6$/1000 carbon atoms. The amount of branches of side chains larger than $CH_3$/1000 carbon atoms are determined by means of $^{13}$C-NMR, as determined by James C. Randall, JMS-REV. Macromol. Chem. Phys., C29 (2&3), 201-317 (1989), and refer to the total content of side chains larger than $CH_3$ groups/1000 carbon atoms (without end groups). It is particularly preferred in polyethylene with 1-butene, 1-hexene or 1-octene as the 1-alkene to have 0.01 to 20 ethyl, butyl or hexyl side branches/1000 carbon atoms, preferably from 1 to 10 ethyl, butyl or hexyl side branches/1000 carbon atoms and particularly preferably from 2 to 6 ethyl, butyl or hexyl side branches/1000 carbon atoms. This refers to the content of ethyl, butyl or hexyl side chains/1000 carbon atoms without the end groups.

The ratio of Eta-values of the polyethylene of the invention Eta(vis)/Eta(GPC) is preferably less than 0.95, preferably less than 0.93 and particularly preferably less than 0.90. Eta (vis) is the intrinsic viscosity as determined according to ISO 1628-1 and -3 in Decalin at 135° C. Eta(GPC) is the viscosity as determined by GPC (gel permeation chromatographie) according to DIN 55672, wherein 1,2,4-Trichlorobenzene is used instead of THF and the determination is carried out at 140° C. instead of room temperature. The Eta(GPC) value is calculated according to Arndt/Müller Polymer Charakterisierung, München 1996, Hanser Verlag, ISBN 3-446-17588-1 with the coefficients of the Mark-Houwing-equation (page 147, equation 4.93) for polyethylene being K=0.00033 dl/g and alpha=0.73, which is adjusted to 1,2,4-Trichlorobenzene at 140° C. by using the GPC-curve M-eta (page 148 and equation 4.94 lower part) to result in the Mark-Houwing-equation (4.93) the value for the intrinsic Viscosity [eta] in Decalin with the values K=0.00062 dl/g and alpha=0.7 for Decalin at 135° C.

In the polyethylene of the invention, the part of the polyethylene having a molar mass of less than 10 000 g/mol, preferably less than 20 000, preferably has a degree of branching of from 0 to 1.5 branches of side chains larger than $CH_3$/1000 carbon atoms, preferably side chains from $C_2$-$C_6$/1000 carbon atoms. Particular preference is given to the part of the polyethylene having a molar mass of less than 10 000 g/mol, preferably less than 20 000, having a degree of branching of from 0.1 to 0.9 branches of side chains larger than $CH_3$/1000 carbon atoms, preferably side chains from $C_2$-$C_6$/1000 carbon atoms. Preferably the polyethylene of the invention with 1-butene, 1-hexene or 1-octene as the α-olefin, the part of the polyethylene having a molar mass of less than 10 000 g/mol, preferably less than 20 000, preferably has a degree of from 0 to 1.5 ethyl, butyl or hexyl branches of side chains/1000 carbon atoms. Particular preference is given to the part of the polyethylene having a molar mass of less than 10 000 g/mol, preferably less than 20 000, having a degree of branching of from 0.1 to 0.9 ethyl, butyl or hexyl branches of side chains/1000 carbon atoms. This too, can be determined by means of the Holtrup/$^{13}$C-NMR method described. This refers to the content of ethyl, butyl or hexyl side chains or in general branches of side chains larger than $CH_3$/1000 carbon atoms without the end groups. Furthermore, it is preferred that at least 70% of the branches of side chains larger than $CH_3$ in the polyethylene of the invention are present in the 50% by weight of the polyethylene having the highest molar masses. This too can be determined by means of the Holtrup/$^{13}$C-NMR method described.

The polyethylene of the invention preferably has a mixing quality measured in accordance with ISO 13949 of less than 3, in particular from 0 to 2.5. This value is based on the polyethylene taken directly from the reactor, i.e. the polyethylene powder without prior melting in an extruder. This polyethylene powder is preferably obtainable by polymerization in a single reactor.

The polyethylene of the invention preferably has a degree of long chain branching λ (lambda) of from 0 to 2 long chain branches/10 000 carbon atoms and particularly preferably from 0.1 to 1.5 long chain branches/10 000 carbon atoms. The degree of long chain branching λ (lambda) was measured by light scattering as described, for example, in ACS Series 521, 1993, Chromatography of Polymers, Ed. Theodore Provder; Simon Pang and Alfred Rudin: Size-Exclusion Chromatographic Assessment of Long-Chain Branch Frequency in Polyethylenes, page 254-269.

As 1-alkenes, which are the comonomers which can be present, either individually or in a mixture with one another, in addition to ethylene in the ethylene copolymer part of the polyethylene of the invention, it is possible to use all 1-alkenes having from 3 to 12 carbon atoms, e.g. propene, 1-butene, 1-pentene, 1-hexene, 4-methyl-1-pentene, 1-heptene, 1-octene and 1-decene. The ethylene copolymer preferably comprises 1-alkenes having from 4 to 8 carbon atoms, e.g. 1-butene, 1-pentene, 1-hexene, 4-methylpentene or 1-octene, in copolymerized form as comonomer unit. Particular preference is given to using 1-alkenes selected from the group consisting of 1-butene, 1-hexene and 1-octene.

The polyethylene of the invention can further comprise of from 0 to 6% by weight, preferably 0.1 to 1 by weight of auxiliaries and/or additives known per se, e.g. processing stabilizers, stabilizers against the effects of light and heat, customary additives such as lubricants, antioxidants, antiblocking agents and antistatics, and also, if appropriate, dyes. A person skilled in the art will be familiar with the type and amount of these additives.

Furthermore, it has been found that the processing properties of the polyethylenes of the invention can be improved further by incorporation of small amounts of fluoroelastomers or thermoplastic polyesters. Such fluoroelastomers are known as such as processing aids and are commercially available, for example, under the trade names Viton® and Dynamar® (cf. also, for example, U.S. Pat. No. 3,125,547). They are preferably added in amounts of from 10 to 1000 ppm, particularly preferably from 20 to 200 ppm, based on the total mass of the polymer blend according to the invention.

In general mixing of the additives and the polyethylene of the invention can be carried out by all known methods. It can be done, for example, by introducing the powder components into a granulation apparatus, e.g. a twin-screw kneader (ZSK), Farrel kneader or Kobe kneader. The granulated mixture can also be processed directly on a film production plant.

We have also found the use of the polyethylenes of the invention for producing films and films in which the polyethylene of the invention is present as a significant component.

Films in which the polyethylene of the invention is present as a significant component are ones which contain from 50 to 100% by weight, preferably from 60 to 90% by weight, of the polyethylene of the invention, based on the total polymer material used for manufacture. In particular, films in which one of the layers contains from 50 to 100% by weight of the polyethylene of the invention are also included.

In general the films are produced by plastification of the polyethylene of the invention at a melt temperature in the range of from 190 to 230° C., forcing of the plasticised polyethylene through an annular die and cooling. The film can further comprise of from 0 to 30% by weight, preferably 0.1 to 3 by weight of auxiliaries and/or additives known per se, e.g. processing stabilizers, stabilizers against the effects of light and heat, customary additives such as lubricants, antioxidants, antiblocking agents and antistatics, and also, if appropriate, dyes.

The polyethylenes of the invention can be used to prepare films with a thickness of from 5 μm to 2.5 mm. The films can e.g. be prepared via blown film extrusion with a thickness of from 5 μm to 250 μm or via flat film extrusion, like cast film extrusion with a thickness of from 10 μm to 2.5 mm. During blown film extrusion the polyethylene melt is forced through an annular die. The bubble that is formed is inflated with air and hauled off at a higher speed than the die outlet speed. The bubble is intensively cooled by a current of air so that the temperature at the frost line is lower than the crystallite melting point. The bubble dimensions are fixed here. The bubble is then collapsed, trimmed if necessary and rolled up using a suitable winding instrument. The polyethylenes of the invention can be extruded by either the "conventional" or the "long stalk" method. The flat films can be obtained e.g. in chill roll lines or thermoforming film lines. Furthermore composite films from the inventive polyethylene can be produced on coating and laminating lines. Especially preferred are composite films wherein paper, aluminium or fabric substrates are incorporated into the composite structure. The films can be monolayered or multilayered, obtained by coextrusion and are preferably monolayered.

The polyethylenes of the invention are, for example, very suitable for producing films on blown film and cast film plants at high outputs. The films display very good mechanical properties, high shock resistance and high ultimate tensile strength together with very good optical properties, in particular transparency and gloss. They are suitable, in particular, for the packing sector, for example as heat sealing films, both for heavy duty sacks and also for the food sector. Furthermore, the films display only a low blocking tendency and can therefore be handled by machines with only small additions, if any, of lubricants and antiblocking agents.

The films of the invention are particularly suitable as stretch films, hygienic films, films for office uses, sealing layers, composite and laminating films. The films are especially suitable in applications requiring high clarity and gloss such as carrier bags to permit high quality printing, laminating films in foodstuff applications, since the films of the invention also have a very low odour and taste level and automatic packaging films, since the film can be processed on high-speed lines.

The films of the invention with a thickness of 50 μm have preferably a haze, as determined by ASTM D 1003-00 on a BYK Gardener Haze Guard Plus Device on at least 5 pieces of film 10×10 cm below 22%, preferably of from 5 to 21% and particularly preferably of from 7 to 20%. The dart drop impact of the film with a thickness of 50 μm as determined by ASTM D 1709 Method A is preferably above 80 g, preferably of from 85 to 400 g and particularly preferably of from 90 to 350 g. The clarity of the film with a thickness of 50 μm as determined by ASTM D 1746-03 on a BYK Gardener Haze Guard Plus Device, calibrated with calibration cell 77.5, on at least 5 pieces of film 10×10 cm is preferably at least 95%, preferably of from 96 to 100% and particularly preferably of from 97 to 99%. The gloss 45° of the film with a thickness of 50 μm as determined by ASTM D 2457-03 on a gloss meter 45° with a vacuum plate for fixing the film, on at least 5 pieces of film is preferably at least 46, preferably of from 47 to 80 and particularly preferably of from 49 to 70.

The scrap obtained during the production of these films can be recycled. Film trimmings are compacted or ground and fed to a side extruder in which they are melted and returned to the main extruder. The film residues should be reground to grains of a size that can be fed into the feed section of the processing machinery together with the virgin polyethylene. The films obtained with regrind inventive films in one layer, do not show any significant deterioration of the properties compared to films without regrind.

The polyethylene of the invention is obtainable using the catalyst system of the invention and in particular its preferred embodiments.

We have also found a catalyst system for preparing the polyethylenes of the invention and a process for preparing the polyethylene of the invention by polymerization of ethylene or copolymerization of ethylene with 1-alkenes with 3 to 12 carbon atoms in the presence of the catalyst system. A preferred process for preparing the polyethylene of the invention by polymerization of ethylene or copolymerization of ethylene with one or several 1-alkenes of formula $R^1CH=CH_2$, in der $R^1$ is hydrogen or an alkyl radical with 1 bis 10 carbon atoms in the presence of the catalyst system at a temperature of from 20 to 200° C. and a pressure of from 0.5 to 100 bar, equivalent to 0.05 to 1 MPa. 1-alkenes are e.g. ethylene, propylene, 1-butene, 1-hexene, 4-methyl-1-pentene or 1-octene.

Preferably ethylene is used in the process as the only monomer or as a mixture of at least 50% by weight ethylene and 50% by weight or less of the 1-alkenes of formula $R^1CH=CH_2$, preferably one of the 1-alkenes of formula $R^1CH=CH_2$. Preferably ethylene is polymerised as a mixture of at least 80% by weight ethylene and 20% by weight or less of the 1-alkenes of formula $R^1CH=CH_2$.

The process of the invention results in polyethylenes with a low transition metal and halogen content due to the high activity of the catalyst. The polyethylenes therefore show high colour stability, corrosion resistance and clarity.

The present invention further provides a catalyst composition comprising at least two different polymerization catalysts of which A) is at least one polymerization catalyst based on a hafnocene (A) and B) is at least one polymerization catalyst based on an iron component having a tridentate ligand bearing at least two aryl radicals with each bearing a halogen or tert.alkyl substituent in the ortho-position (B).

The invention further provides a process for the polymerization of olefins in the presence of the catalyst composition of the invention.

Hafnocene catalyst components are, for example, cyclopentadienyl complexes. The cyclopentadienyl complexes can be, for example, bridged or unbridged biscyclopentadienyl complexes as described, for example, in EP 129 368, EP 561 479, EP 545 304 and EP 576 970, monocyclopentadienyl complexes such as bridged amidocyclopentadienyl complexes described, for example, in EP 416 815, multinuclear cyclopentadienyl complexes as described in EP 632 063, pi-ligand-substituted tetrahydropentalenes as described in EP 659 758 or pi-ligand-substituted tetrahydroindenes as described in EP 661 300.

Particularly suitable hafnocenes (A) are hafnium complexes of the general formula (I)

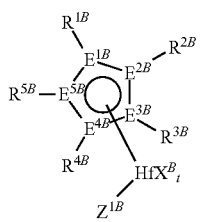
(I)

where the substituents and indices have the following meanings:

$X^B$ is fluorine, chlorine, bromine, iodine, hydrogen, $C_1$-$C_{10}$-alkyl, $C_2$-$C_{10}$-alkenyl, $C_6$-$C_{15}$-aryl, alkylaryl having from 1 to 10 carbon atoms in the alkyl part and from 6 to 20 carbon atoms in the aryl part, —$OR^{6B}$ or —$NR^{6B}R^{7B}$, or two radicals $X^B$ form a substituted or unsubstituted diene ligand, in particular a 1,3-diene ligand, and the radicals $X^B$ are identical or different and may be joined to one another, $E^{1B}$-$E^{5B}$ are each carbon or not more than one $E^{1B}$ to $E^{5B}$ is phosphorus or nitrogen, preferably carbon, t is 1, 2 or 3 and is, depending on the valence of Hf, such that the metallocene complex of the general formula (VI) is uncharged, where $R^{6B}$ and $R^{7B}$ are each $C_1$-$C_{10}$-alkyl, $C_6$-$C_{15}$-aryl, alkylaryl, arylalkyl, fluoroalkyl or fluoroaryl each having from 1 to 10 carbon atoms in the alkyl part and from 6 to 20 carbon atoms in the aryl part and $R^{1B}$ to $R^{5B}$ are each, independently of one another hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon $N(SiR^{8B}_3)_2$, $OR^{8B}$, $OSiR^{8B}_3$, $SiR^{8B}_3$, where the organic radicals $R^{1B}$-$R^{5B}$ may also be substituted by halogens and/or two radicals $R^{1B}$-$R^{5B}$, in particular vicinal radicals, may also be joined to form a five-, six- or seven-membered ring, and/or two vicinal radicals $R^{1D}$-$R^{5D}$ may be joined to form a five-, six- or seven-membered heterocycle containing at least one atom from the group consisting of N, P, O and S, where the radicals $R^{8B}$ can be identical or different and can each be $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy and $Z^{1B}$ is $X^B$ or

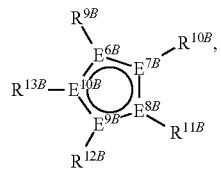

where the radicals $R^{9B}$ to $R^{13B}$ are each, independently of one another, hydrogen, $C_1$-$C_{22}$-alkyl, 5- to 7-membered cycloalkyl or cycloalkenyl which may in turn bear $C_1$-$C_{10}$-alkyl groups as substituents, $C_2$-$C_{22}$-alkenyl, $C_6$-$C_{22}$-aryl, arylalkyl having from 1 to 16 carbon atoms in the alkyl part and 6-21 carbon atoms in the aryl part, $NR^{14B}_2$, $N(SiR^{14B}_3)_2$, $OR^{14B}$, $OSiR^{14B}_3$, $SiR^{14B}_3$, where the organic radicals $R^{9B}$-$R^{13B}$ may also be substituted by halogens and/or two radicals $R^{9B}$-$R^{13B}$, in particular vicinal radicals, may also be joined to form a five-, six- or seven-membered ring, and/or two vicinal radicals $R^{9B}$-$R^{13B}$ may be joined to form a five-, six- or seven-membered heterocycle containing at least one atom from the group consisting of N, P, O and S, where the radicals $R^{14B}$ are identical or different and are each $C_1$-$C_{10}$-alkyl, $C_3$-$C_{10}$-cycloalkyl, $C_6$-$C_{15}$-aryl, $C_1$-$C_4$-alkoxy or $C_6$-$C_{10}$-aryloxy, $E^{6B}$-$E^{10B}$ are each carbon or not more than one $E^{6B}$ to $E^{10B}$ is phosphorus or nitrogen, preferably carbon, or where the radicals $R^{4B}$ and $Z^{1B}$ together form an —$R^{15B}_v$-$A^{1B}$-group, where $R^{15B}$ is

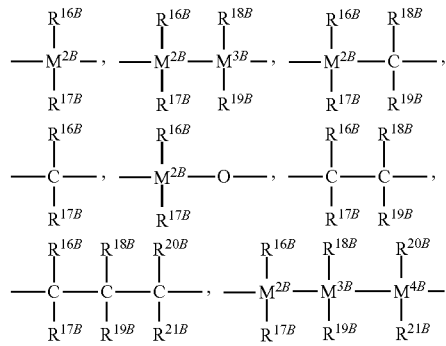

=$BR^{16B}$, =$BNR^{16B}R^{17B}$, =$AlR^{16B}$, —Ge—, —Sn—, —O—, —S—, °SO, =$SO_2$, =$NR^{16B}$, =CO, =$PR^{16B}$ or =$P(O)R^{16B}$, where $R^{16B}$-$R^{21B}$ are identical or different and are each a hydrogen atom, a halogen atom, a trimethylsilyl group, a $C_1$-$C_{10}$-alkyl group, a $C_1$-$C_{10}$-fluoroalkyl group, a $C_6$-$C_{10}$-fluoroaryl group, a $C_6$-$C_{10}$-aryl group, a $C_1$-$C_{10}$-alkoxy group, a $C_7$-$C_{15}$-alkylaryloxy group, a $C_2$-$C_{10}$-alkenyl group, a $C_7$-$C_{40}$-arylalkyl group, a $C_8$-$C_{40}$-arylalkenyl group or a $C_7$-$C_{40}$-alkylaryl group or two adjacent radicals together with the atoms connecting them form a saturated or unsaturated ring having from 4 to 15 carbon atoms, and $M^{2B}$-$M^{4B}$ are each silicon, germanium or tin, or preferably silicon,
$A^{1B}$ is —O—, —S—,

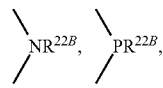

=O, =S, =$NR^{22B}$, —O—$R^{22B}$,
—$NR^{22B}{}_2$, $R^{22B}{}_2$ or an unsubstituted, substituted or fused, heterocyclic ring system, where
the radicals $R^{22B}$ are each, independently of one another, $C_1$-$C_{10}$-alkyl, $C_6$-$C_{15}$-aryl, $C_3$-$C_{10}$-cycloalkyl, $C_7$-$C_{18}$-alkylaryl or Si($R^{23}$)$_3$,
$R^{23B}$ is hydrogen, $C_1$-$C_{10}$-alkyl, $C_6$-$C_{15}$-aryl which may in turn bear $C_1$-$C_4$-alkyl groups as substituents or $C_3$-$C_{10}$-cycloalkyl,
v is 1 or when $A^{1B}$ is an unsubstituted, substituted or fused, heterocyclic ring system may also be 0
or where the radicals $R^{4B}$ and $R^{12B}$ together form an —$R^{15B}$- group.

$A^{1B}$ can, for example together with the bridge $R^{15B}$, form an amine, ether, thioether or phosphine. However, $A^{1B}$ can also be an unsubstituted, substituted or fused, heterocyclic aromatic ring system which can contain heteroatoms from the group consisting of oxygen, sulfur, nitrogen and phosphorus in addition to ring carbons. Examples of 5-membered heteroaryl groups which can contain from one to four nitrogen atoms and/or a sulfur or oxygen atom as ring members in addition to carbon atoms are 2-furyl, 2-thienyl, 2-pyrrolyl, 3-isoxazolyl, 5-isoxazolyl, 3-isothiazolyl, 5-isothiazolyl, 1-pyrazolyl, 3-pyrazolyl, 5-pyrazolyl, 2-oxazolyl, 4-oxazolyl, 5-oxazolyl, 2-thiazolyl, 4-thiazolyl, 5-thiazolyl, 2-imidazolyl, 4-imidazolyl, 5-imidazolyl, 1,2,4-oxadiazol-3-yl, 1,2,4-oxadiazol-5-yl, 1,3,4-oxadiazol-2-yl and 1,2,4-triazol-3-yl. Examples of 6-membered heteroaryl groups which may contain from one to four nitrogen atoms and/or a phosphorus atom are 2-pyridinyl, 2-phosphabenzenyl, 3-pyridazinyl, 2-pyrimidinyl, 4-pyrimidinyl, 2-pyrazinyl, 1,3,5-triazin-2-yl and 1,2,4-triazin-3-yl, 1,2,4-triazin-5-yl and 1,2,4-triazin-6-yl. The 5-membered and 6-membered heteroaryl groups may also be substituted by $C_1$-$C_{10}$-alkyl, $C_6$-$C_{10}$-aryl, alkylaryl having from 1 to 10 carbon atoms in the alkyl part and 6-10 carbon atoms in the aryl part, trialkylsilyl or halogens such as fluorine, chlorine or bromine or be fused with one or more aromatics or heteroaromatics. Examples of benzo-fused 5-membered heteroaryl groups are 2-indolyl, 7-indolyl, 2-coumaronyl, 7-coumaronyl, 2-thionaphthenyl, 7-thionaphthenyl, 3-indazolyl, 7-indazolyl, 2-benzimidazolyl and 7-benzimidazolyl. Examples of benzo-fused 6-membered heteroaryl groups are 2-quinolyl, 8-quinolyl, 3-cinnolyl, 8-cinnolyl, 1-phthalazyl, 2-quinazolyl, 4-quinazolyl, 8-quinazolyl, 5-quinoxalyl, 4-acridyl, 1-phenanthridyl and 1-phenazyl. Naming and numbering of the heterocycles has been taken from L. Fieser and M. Fieser, Lehrbuch der organischen Chemie, 3$^{rd}$ revised edition, Verlag Chemie, Weinheim 1957.

The radicals $X^B$ in the general formula (I) are preferably identical, preferably fluorine, chlorine, bromine, $C_1$-$C_7$-alkyl or aralkyl, in particular chlorine, methyl or benzyl.

The synthesis of such complexes can be carried out by methods known per se, with the reaction of the appropriately substituted cyclic hydrocarbon anions with halides of hafnium being preferred. Examples of appropriate preparative methods are described, for example, in Journal of Organometallic Chemistry, 369 (1989), 359-370.

The hafnocenes can be used in the Rac or pseudo-Rac form. The term pseudo-Rac refers to complexes in which the two cyclopentadienyl ligands are in the Rac arrangement relative to one another when all other substituents of the complex are disregarded.

Examples of suitable hafnocenes (A) are, inter alia, methylenebis(cyclopentadienyl)hafnium dichloride, methylenebis(3-methylcyclopentadienyl)hafnium dichloride, methylenebis(3-n-butylcyclopentadienyl)hafnium dichloride, methylenebis(indenyl)hafnium dichloride, methylenebis(tetrahydroindenyl)hafnium dichloride, isopropylidenebis(cyclopentadienyl)hafnium dichloride, isopropylidenebis(3-trimethylsilylcyclopentadienyl)hafnium dichloride, isopropylidenebis(3-methylcyclopentadienyl)hafnium dichloride, isopropylidenebis(3-n-butylcyclopentadienyl)hafnium dichloride, isopropylidenebis(3-phenylcyclopentadienyl)hafnium dichloride, isopropylidenebis(indenyl)hafnium dichloride, isopropylidenebis(tetrahydroindenyl)hafnium dichloride, dimethylsilanediylbis(cyclopentadienyl)hafnium dichloride, dimethylsilanediylbis(indenyl)hafnium dichloride, dimethylsilanediylbis(tetrahydroindenyl)hafnium dichloride, ethylenebis(cyclopentadienyl)hafnium dichloride, ethylenebis(indenyl)hafnium dichloride, ethylenebis(tetrahydroindenyl)hafnium dichloride, tetramethylethylene-9-fluorenylcyclopentadienylhafnium dichloride, dimethylsilanediylbis(tetramethylcyclopentadienyl)hafnium dichloride, dimethylsilanediylbis(3-trimethylsilylcyclopentadienyl)hafnium dichloride, dimethylsilanediylbis(3-methylcyclopentadienyl)hafnium dichloride, dimethylsilanediylbis(3-n-butylcyclopentadienyl)hafnium dichloride, dimethylsilanediylbis(3-tert-butyl-5-methylcyclopentadienyl)hafnium dichloride, dimethylsilanediylbis(3-tert-butyl-5-ethylcyclopentadienyl)hafnium dichloride, dimethylsilanediylbis(2-methylindenyl)hafnium dichloride, dimethylsilanediylbis(2-isopropylindenyl)hafnium dichloride, dimethylsilanediylbis(2-tert-butylindenyl)hafnium dichloride, diethylsilanediylbis(2-methylindenyl)hafnium dibromide, dimethylsilanediylbis(3-methyl-5-methylcyclopentadienyl)hafnium dichloride, dimethylsilanediylbis(3-ethyl-5-isopropylcyclopentadienyl)hafnium dichloride, dimethylsilanediylbis(2-ethylindenyl)hafnium dichloride, dimethylsilanediylbis(2-methyl-4,5-benzindenyl)hafnium dichloride, dimethylsilanediylbis(2-ethyl-4,5-benzindenyl)hafnium dichloride, methylphenylsilanediylbis(2-ethyl-4,5-benzindenyl)hafnium dichloride, diphenylsilanediylbis(2-methyl-4,5-benzindenyl)hafnium dichloride, diphenylsilanediylbis(2-ethyl-4,5-benzindenyl)hafnium dichloride, diphenylsilanediylbis(2-methylindenyl)hafnium dichloride, dimethylsilanediylbis(2-methyl-4-phenylindenyl)hafnium dichloride, dimethylsilanediylbis(2-ethyl-4-phenylindenyl)hafnium dichloride, dimethylsilanediylbis(2-methyl-4-(1-naphthyl)indenyl)hafnium dichloride, dimethylsilanediylbis(2-ethyl-4-(1-naphthyl)indenyl) hafnium dichloride, dimethylsilanediylbis(2-propyl-4-(9-phenanthryl)indenyl)hafnium dichloride, dimethylsilanediylbis(2-methyl-4-isopropylindenyl)hafnium dichloride, dimethylsilanediylbis(2,7-dimethyl-4-isopropylindenyl)hafnium dichloride, dimethylsilanediylbis(2-methyl-4,6-diisopropylindenyl)hafnium dichloride, dimethylsilanediylbis(2-methyl-4[p-trifluoromethylphenyl]indenyl) hafnium dichloride, dimethylsilanediylbis(2-methyl-4-[3',5'-dimethylphenyl]indenyl)hafnium dichloride, dimethylsilanediylbis(2-methyl-4-[4'-tert-butylphenyl]indenyl)hafnium dichloride, diethylsilanediylbis(2-methyl-4-[4'- tert-butylphenyl]indenyl)hafnium dichloride, dimethylsilanediylbis(2-ethyl-4-[4'-tert-butylphenyl]-indenyl)hafnium dichloride, dimethylsilanediylbis(2-propyl-4-[4'-tert-butylphenyl]indenyl)hafnium dichloride, dimethylsilanediylbis (2-isopropyl-4-[4'-tert-butylphenyl]indenyl)hafnium dichloride, dimethylsilanediylbis(2-n-butyl-4-[4'-tert-butylphenyl] indenyl)hafnium dichloride, dimethylsilanediylbis(2-hexyl-4-[4'-tert-butylphenyl]indenyl)hafnium dichloride, dimethylsilanediyl(2-isopropyl-4-(1-naphthyl)indenyl)(2-methyl-4-(1-naphthyl)indenyl)hafnium dichloride, dimethylsilanediyl(2-isopropyl-4-[4'-tert-butylphenyl]indenyl)(2-methyl-4-[1'-naphthyl]indenyl)hafnium dichloride and ethylene(2-isopropyl-4-[4'-tert-butylphenyl] indenyl)(2-methyl-4-[4'-tert-butylphenyl]indenyl)hafnium dichloride, and also the corresponding dimethylhafnium, monochloromono (alkylaryloxy)hafnium and di(alkylaryloxy)hafnium compounds. The complexes can be used in the rac form, the meso form or as mixtures of these.

Among the hafnocenes of the general formula (I), those of the formula (II)

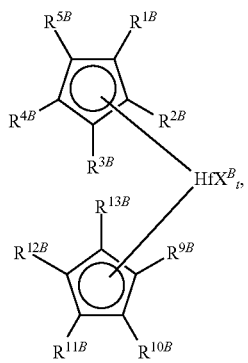

(II)

are preferred.

Among the compounds of the formula (VII), preference is given to those in which $X^B$ is fluorine, chlorine, bromine, $C_1$-$C_4$-alkyl or benzyl, or two radicals $X^B$ form a substituted or unsubstituted butadiene ligand, t is 1 or 2, preferably 2, $R^{1B}$ to $R^{5B}$ are each hydrogen, $C_1$-$C_8$-alkyl, $C_6$-$C_8$-aryl, $NR^{8B}_2$, $OSiR^{8B}_3$ or $Si(R^{8B})_3$ and $R^{9B}$ to $R^{13B}$ are each hydrogen, $C_1$-$C_8$-alkyl or $C_6$-$C_8$-aryl, $NR^{14B}_2$, $OSiR^{14B}_3$ or $Si(R^{14B})_3$ or in each case two radicals $R^{1B}$ to $R^{5B}$ and/or $R^{9B}$ to $R^{13B}$ together with the $C_5$ ring form an indenyl, fluorenyl or substituted indenyl or fluorenyl system.

The hafnocenes of the formula (II) in which the cyclopentadienyl radicals are identical are particularly useful.

Examples of particularly suitable compounds (A) of the formula (II) are, inter alia: bis(cyclopentadienyl)hafnium dichloride, bis(indenyl)hafnium dichloride, bis(fluorenyl) hafnium dichloride, bis(tetrahydroindenyl)hafnium dichloride, bis(pentamethylcyclopentadienyl)hafnium dichloride, bis(trimethylsilylcyclopentadienyl)hafnium dichloride, bis (trimethoxysilylcyclopentadienyl)hafnium dichloride, bis (ethylcyclopentadienyl)hafnium dichloride, bis(isobutylcyclopentadienyl)hafnium dichloride, bis(3-butenylcyclopentadienyl)hafnium dichloride, bis (methylcyclopentadienyl)hafnium dichloride, bis(1,3-di-tert-butylcyclopentadienyl)hafnium dichloride, bis (trifluoromethylcyclopentadienyl)hafnium dichloride, bis (tert-butylcyclopentadienyl)hafnium dichloride, bis(n-butyl-cyclopentadienyl)hafnium dichloride, bis(phenylcyclopentadienyl)hafnium dichloride, bis(N,N-dimethylaminomethyl-cyclopentadienyl)hafnium dichloride, bis(1,3-dimethylcyclopentadienyl)hafnium dichloride, bis(1-n-butyl-3-methylcyclopentadienyl)hafnium dichloride, (cyclopentadienyl)(methylcyclopentadienyl)hafnium dichloride, (cyclopentadienyl)(n-butylcyclopentadienyl) hafnium dichloride, (methylcyclopentadienyl)(n-butylcyclopentadienyl)hafnium dichloride, (cyclopentadienyl)(1-methyl-3-n-butylcyclopentadienyl)hafnium dichloride, bis (tetramethylcyclopentadienyl)hafnium dichloride and also the corresponding dimethylhafnium compounds.

Further examples are the corresponding hafnocene compounds in which one or two of the chloride ligands have been replaced by bromide or iodide.

Suitable catalysts B) are transition metal complexes with at least one ligand of the general formulae (III),

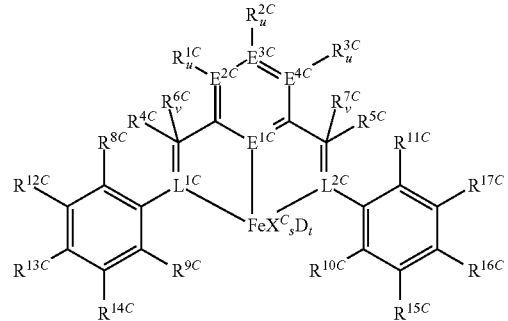

(III)

where the variables have the following meanings:

$E^{1C}$ is nitrogen or phosphorus, in particular nitrogen, $E^{2C}$-$E^{4C}$ are each, independently of one another, carbon, nitrogen or phosphorus, in particular carbon, $R^{1C}$-$R^{3C}$ are each, independently of one another, hydrogen $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring, and/or two vicinal radicals $R^{1C}R^{3C}$ are joined to form a five-, six- or seven-membered heterocycle containing at least one atom from the group consisting of N, P, O and S, $R^{4C}$-$R^{7C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, $NR^{18C}_2$, $SiR^{19C}_3$, where the organic radicals $R^{4C}$-$R^{7C}$ may also be substituted by halogens and/or two geminal or vicinal radicals $R^{4C}$-$R^{7C}$ may also be joined to form a five-, six- or seven-membered ring, and/or two geminal or vicinal radicals $R^{4C}$-$R^{9C}$ are joined to form a five-, six- or seven-membered heterocycle containing at least one atom from the group consisting of N, P, O and S, and when v is 0, $R^{6C}$ is a bond to $L^{1C}$ and/or $R^{7C}$ is a bond to $L^{2C}$ so that $L^{1C}$ forms a double bond to the carbon atom bearing $R^{4C}$ and/or $L^{2C}$ forms a double bond to the carbon atom bearing $R^{5C}$, u is 0 when $E^{2C}$-$E^{4C}$ is nitrogen or phosphorus and is 1 when $E^{2C}$-$E^{4C}$ is carbon, $L^{1C}$-$L^{2C}$ are each, independently of one another, nitrogen or phosphorus, in particular nitrogen, $R^{8C}$-$R^{11C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{8C}$-$R^{11C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O and S, and with the proviso that at least $R^{8C}$ and $R^{10C}$ are halogen or a tert. $C_1$-$C_{22}$-alkyl group, $R^{12C}$-$R^{17C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{12C}$-$R^{17C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O and S, the indices v are each, independently of one another, 0 or 1, the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl part and 6-20 carbon atoms in the aryl part, $NR^{18C}_2$, $OR^{18C}$, $SR^{18C}$, $SO_3R^{18C}$, $OC(O)R^{18C}$, CN, SCN, β-diketonate, CO, $BF_4^-$, $PF_6^-$ or a bulky noncoordinating anion and the radicals $X^C$ may be joined to one another, the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^{19C}_3$, where the organic radicals $R^{18C}$ may also be substituted by halogens or nitrogen- and oxygen-containing groups and two radicals $R^{18C}$ may also be joined to form a five- or six-membered ring, the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, where the organic radicals $R^{19C}$ may also be substituted by halogens or nitrogen- and oxygen-containing groups and two radicals $R^{19C}$ may also be joined to form a five- or six-membered ring, s is 1, 2, 3 or 4, in particular 2 or 3, D is an uncharged donor and t is from 0 to 4, in particular 0, 1 or 2.

The three atoms $E^{2C}$ to $E^{4C}$ in a molecule can be identical or different. If $E^{1C}$ is phosphorus, then $E^{2C}$ to $E^{4C}$ are preferably each carbon. If $E^{1C}$ is nitrogen, then $E^{2C}$ to $E^{4C}$ are each preferably nitrogen or carbon, in particular carbon.

The substituents $R^{1C}$-$R^{3C}$ and $R^{8C}$-$R^{17C}$ can be varied within a wide range. Possible carboorganic substituents $R^{1C}$-$R^{3C}$ and $R^{8C}$-$R^{17C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituents, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two radicals $R^{1C}$ to $R^{3C}$ and/or two vicinal radicals $R^{8C}$-$R^{17C}$ may also be joined to form a 5-, 6- or 7-membered ring and/or two of the vicinal radicals $R^{1C}$-$R^{3C}$ and/or two of the vicinal radicals $R^{8C}$-$R^{17C}$ may be joined to form a five-, six- or seven-membered heterocycle containing at least one atom from the group consisting of N, P, O and S and/or the organic radicals $R^{1C}$-$R^{3C}$ and/or $R^{8C}$-$R^{17C}$ may also be substituted by halogens such as fluorine, chlorine or bromine. Furthermore, $R^{1C}$-$R^{3C}$ and $R^{8C}$-$R^{17C}$ can also be amino $NR^{18C}_2$ or $N(SiR^{19C}_3)_2$, alkoxy or aryloxy $OR^{18C}$, for example dimethylamino, N-pyrrolidinyl, picolinyl, methoxy, ethoxy or isopropoxy or halogen such as fluorine, chlorine or bromine. Possible radicals $R^{19C}$ in organosilicon substituents $SiR^{19C}_3$ are the same carboorganic radicals as have been described above for $R^{1C}$-$R^{3C}$, where two $R^{19C}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}_3$ radicals may also be bound to $E^{2C}$-$E^{4C}$ via an oxygen or nitrogen, for example trimethylsilyloxy, triethylsilyloxy, butyldimethylsilyloxy, tributylsilyloxy or tri-tert-butylsilyloxy.

Preferred radicals $R^{1C}$-$R^{3C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or -dichloro-substituted phenyls, trialkyl- or trichloro-substituted phenyls, naphthyl, biphenyl and anthranyl. Particularly preferred organosilicon substituents are trialkylsilyl groups having from 1 to 10 carbon atoms in the alkyl radical, in particular trimethylsilyl groups.

Preferred radicals $R^{12C}$-$R^{17C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. In particular, $R^{13C}$ and $R^{16C}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{12C}$, $R^{14C}$, $R^{15C}$ and $R^{17C}$ each hydrogen.

Preferred radicals $R^{9C}$ and $R^{11C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine. In particular, $R^{8C}$ and $R^{10C}$ are preferably a halogen such as fluorine, chlorine or bromine, particularly chlorine and $R^{9C}$ and $R^{11C}$ are each a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl, or a halogen such as fluorine, chlorine or bromine. In another preferred combination $R^{8C}$ and $R^{10C}$ are a tertiary $C_1$-$C_{22}$-alkyl radical, particularly tert.butyl and $R^{9C}$ and $R^{11C}$ are each hydrogen or a halogen such as fluorine, chlorine or bromine.

In particular, $R^{12C}$, $R^{14C}$, $R^{15C}$ and $R^{17C}$ are identical, $R^{13C}$ and $R^{16C}$ are identical, $R^{9C}$ and $R^{11C}$ are identical and $R^{8C}$ and $R^{10C}$ are identical. This is also preferred in the preferred embodiments described above.

The substituents $R^{4C}$-$R^{7C}$, too, can be varied within a wide range. Possible carboorganic substituents $R^{4C}$-$R^{7C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl, where the arylalkyl may be substituted by further alkyl groups, e.g. benzyl, o-, m-, p-methylbenzyl, 1- or 2-ethylphenyl, where two radicals $R^{4C}$ to $R^{7C}$ may also be joined to form a 5-, 6- or 7-membered ring and/or two geminal radicals $R^{4C}$-$R^{7C}$ may be joined to form a five-, six- or seven-membered heterocycle containing at least one atom from the group consisting of N, P, O and S and/or the organic radicals $R^{4C}$-$R^{7C}$ may also be substituted by halogens such as fluorine, chlorine or bromine. Furthermore, $R^{4C}$-$R^{7C}$ may be amino $NR^{18C}_2$ or $N(SiR^{19C}_3)_2$, for example dimethylamino, N-pyrrolidinyl or picolinyl. Possible radicals $R^{19C}$ in organosilicone substituents $SiR^{19C}_3$ are the same carboorganic radicals as have been described above for $R^{1C}$-$R^{3C}$, where two $R^{19C}$ may also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}_3$ radicals can also be bound via nitrogen to the carbon bearing them. When v is 0, $R^{6C}$ is a bond to $L^{1C}$ and/or $R^{7C}$ is a bond to $L^{2C}$, so that $L^{1C}$ forms a double bond to the carbon atom bearing $R^{4C}$ and/or $L^{2C}$ forms a double bond to the carbon atom bearing $R^{5C}$.

Preferred radicals $R^{4C}$-$R^{7C}$ are hydrogen, methyl, ethyl, n-propyl, isopropyl, n-butyl, isobutyl, tert-butyl, n-pentyl, n-hexyl, n-heptyl, n-octyl, benzyl, phenyl, ortho-dialkyl- or dichloro-substituted phenyls, trialkyl- or trichloro-substituted phenyls, naphthyl, biphenyl and anthranyl. Preference is also given to amide substituents $NR^{18C}_2$, in particular secondary amides such as dimethylamide, N-ethylmethylamide, diethylamide, N-methylpropylamide, N-methylisopropylamide, N-ethylisopropylamide, dipropylamide, diisopropylamide, N-methylbutylamide, N-ethylbutylamide, N-methyl-tert-butylamide, N-tert-butylisopropylamide, dibutylamide, di-sec-butylamide, diisobutylamide, tert-amyl-tert-butylamide, dipentylamide, N-methylhexylamide, dihexylamide, tert-amyl-tert-octylamide, dioctylamide, bis(2-ethylhexyl) amide, didecylamide, N-methyloctadecylamide, N-methylcyclohexylamide, N-ethylcyclohexylamide, N-isopropylcyclohexylamide, N-tert-butyl-cyclohexylamide, dicyclohexylamide, pyrrolidine, piperidine, hexamethylenimine, decahydroquinoline, diphenylamine, N-methylanilide or N-ethylanilide.

$L^{1C}$ and $L^{2C}$ are each, independently of one another, nitrogen or phosphorus, in particular nitrogen, and when v is 0 can form a double bond with the carbon atom bearing $R^{4C}$ or $R^{5C}$. In particular, when v is 0, $L^{1C}$ and/or $L^{2C}$ together with the carbon atom bearing $R^{4C}$ or $R^{5C}$ form an imino group —$CR^{4C}$=N— or —$CR^{5C}$=N—. When v is 1, $L^{1C}$ and/or $L^{2C}$ together with the carbon atom bearing $R^{4C}$ or $R^{5C}$ forms, in particular, an amido group —$CR^{4C}R^{6C}$—N$^-$— or —$CR^{5C}R^{7C}$—N$^-$—.

The ligands $X^C$ result, for example, from the choice of the appropriate starting metal compounds used for the synthesis of the iron complexes, but can also be varied afterward. Possible ligands $X^C$ are, in particular, the halogens such as fluorine, chlorine, bromine or iodine, in particular chlorine. Alkyl radicals such as methyl, ethyl, propyl, butyl, vinyl, allyl, phenyl or benzyl are also usable ligands $X^C$. As further ligands $X^C$, mention may be made, purely by way of example and in no way exhaustively, of trifluoroacetate, $BF_4^-$, $PF_6^-$ and weakly coordinating or noncoordinating anions (cf., for example, S. Strauss in Chem. Rev. 1993, 93, 927-942), e.g. $B(C_6F_5)_4^-$. Amides, alkoxides, sulfonates, carboxylates and β-diketonates are also particularly useful ligands $X^C$. Some of these substituted ligands X are particularly preferably used since they are obtainable from cheap and readily available starting materials. Thus, a particularly preferred embodiment is that in which $X^C$ is dimethylamide, methoxide, ethoxide, isopropoxide, phenoxide, naphthoxide, triflate, p-toluenesulfonate, acetate or acetylacetonate.

Variation of the radicals $R^{18C}$ enables, for example, physical properties such as solubility to be finely adjusted. Possible carboorganic substituents $R^{18C}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{20}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may be substituted by further alkyl groups and/or N- or O-containing radicals, e.g. phenyl, naphthyl, biphenyl, anthranyl, o-, m-, p-methylphenyl, 2,3-, 2,4-, 2,5- or 2,6-dimethylphenyl, 2,3, 4-, 2,3,5-, 2,3,6-, 2,4,5-, 2,4,6- or 3,4,5-trimethylphenyl, 2-methoxyphenyl, 2-N,N-dimethylaminophenyl, or arylalkyl which may be substituted by further alkyl groups, e.g. benzyl, o-, m-, p-methylbenzyl, 1- or 2-ethylphenyl, where two radicals $R^{18C}$ may also be joined to form a 5- or 6-membered ring and the organic radicals $R^{18C}$ may also be substituted by halogens such as fluorine, chlorine or bromine. Possible radicals $R^{19C}$ in organosilicon substituents $SiR^{19C}_3$ are the same radicals which have been described above for $R^{18C}$, where two radicals $R^{19C}$ may also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl, and also vinyl allyl, benzyl and phenyl as radicals $R^{18C}$.

The number s of the ligands $X^C$ depends on the oxidation state of the iron. The number s can thus not be given in general terms. The oxidation state of the iron in catalytically active complexes is usually known to those skilled in the art. However, it is also possible to use complexes whose oxidation state does not correspond to that of the active catalyst. Such complexes can then be appropriately reduced or oxidized by means of suitable activators. Preference is given to using iron complexes in the oxidation state +3 or +2.

D is an uncharged donor, in particular an uncharged Lewis base or Lewis acid, for example amines, alcohols, ethers, ketones, aldehydes, esters, sulfides or phosphines which may be bound to the iron center or else still be present as residual solvent from the preparation of the iron complexes.

The number t of the ligands D can be from 0 to 4 and is often dependent on the solvent in which the iron complex is prepared and the time for which the resulting complexes are dried and can therefore also be a nonintegral number such as 0.5 or 1.5. In particular, t is 0, 1 to 2.

In a preferred embodiment the complexes (B) are of formula (IV)

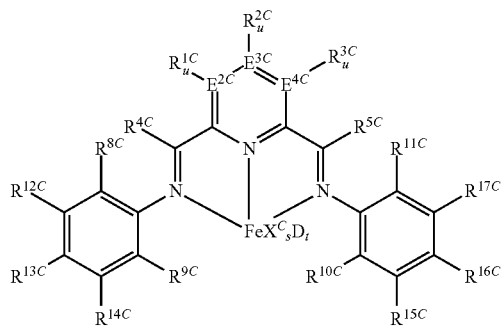

(IV)

where $E^{2C}$-$E^{4C}$ are each, independently of one another, carbon, nitrogen or phosphorus, in particular carbon, $R^{1C}$-$R^{3C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring, and/or two vicinal radicals $R^{1C}$-$R^{3C}$ are bound to form a five-, six- or seven-membered heterocycle containing at least one atom from the group consisting of N, P, O and S, $R^{4C}$-$R^{5C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, $NR^{18C}_2$, $SiR^{19C}_3$, where the organic radicals $R^{4C}$-$R^{5C}$ may also be substituted by halogens, u is 0 when $E^{2C}$-$E^{4C}$ is nitrogen or phosphorus and is 1 when $E^{2C}$-$E^{4C}$ is carbon, $L^{1C}$-$L^{2C}$ are each, independently of one another, nitrogen or phosphorus, in particular nitrogen, $R^{8C}$-$R^{11C}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{8C}$-$R^{11C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O and S, and with the proviso that at least $R^{8C}$ and $R^{10C}$ are halogen or a tert. $C_1$-$C_{22}$-alkyl group, $R^{12C}$-$R^{17C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl part and 6-20 carbon atoms in the aryl part, halogen, $NR^{18C}_2$, $OR^{18C}$, $SiR^{19C}_3$, where the organic radicals $R^{12C}$-$R^{17C}$ may also be substituted by halogens and/or two vicinal radicals $R^{8C}$-$R^{17C}$ may also be joined to form a five-, six- or seven-membered ring, and/or two vicinal radicals $R^{8C}$-$R^{17C}$ are joined to form a five-, six- or seven-membered heterocycle containing at least one atom from the group consisting of N, P, O or S, the indices v are each, independently of one another, 0 or 1, the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl part and 6-20 carbon atoms in the aryl part, $NR^{18C}_2$, $OR^{18C}$, $SR^{18C}$, $SO_3R^{18C}$, $OC(O)R^{18C}$, CN, SCN, β-diketonate, CO, $BF_4^-$, $PF_6^-$ or a bulky noncoordinating anion and the radicals $X^C$ may be joined to one another, the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, $SiR^{19C}_3$, where the organic radicals $R^{18C}$ may also be substituted by halogens and nitrogen- and oxygen-containing groups and two radicals $R^{18C}$ may also be joined to form a five- or six-membered ring, the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl part and 6-20 carbon atoms in the aryl part, where the organic radicals $R^{19C}$ may also be substituted by halogens or nitrogen- and oxygen-containing groups and two radicals $R^{19C}$ may also be joined to form a five- or six-membered ring, s is 1, 2, 3 or 4, in particular 2 or 3, D is an uncharged donor and t is from 0 to 4, in particular 0, 1 or 2.

The embodiments and preferred embodiments described above likewise apply to $E^{2C}$-$E^{4C}$, $R^{1C}$-$R^{3C}$, $X^C$, $R^{18C}$ and $R^{19C}$.

The substituents $R^{4C}$-$R^{5C}$ can be varied within a wide range. Possible carboorganic substituents $R^{4C}$-$R^{5C}$ are, for example, the following: hydrogen, $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where the organic radicals $R^{4C}$-$R^{5C}$ may also be substituted by halogens such as fluorine, chlorine or bromine. Furthermore, $R^{4C}$-$R^{5C}$ can be amino $NR^{18C}_2$ or $N(SiR^{19C}_3)_2$, for example dimethylamino, N-pyrrolidinyl or picolinyl. Possible radicals $R^{19C}$ in organosilicon substituents $SiR^{19C}_3$ are the same carboorganic radicals as described above for $R^{1C}$-$R^{3C}$, where two radicals $R^{19C}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{19C}_3$ radicals can also be bound via nitrogen to the carbon bearing them.

Preferred radicals $R^{4C}$-$R^{5C}$ are hydrogen, methyl, ethyl, n-propyl, isopropyl, n-butyl, isobutyl, tert-butyl, n-pentyl, n-hexyl, n-heptyl, n-octyl or benzyl, in particular methyl.

The substituents $R^{8C}$-$R^{17C}$ can be varied within a wide range. Possible carboorganic substituents $R^{8C}$-$R^{17C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropyl, cyclobutyl, cyclopentyl, cyclohexyl, cycloheptyl, cyclooctyl, cyclononyl or cyclododecyl, $C_2$-$C_{22}$-alkenyl which may be linear, cyclic or branched and in which the double may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may be substituted by further alkyl groups, e.g. benzyl, o-, m-, p-methylbenzyl, 1- or 2-ethylphenyl, where two radicals $R^{8C}$ to $R^{17C}$ may also be joined to form a 5-, 6- or 7-membered ring and/or two of the vicinal radicals $R^{8C}$-$R^{17C}$ may be joined to form a five-, six- or seven-membered heterocycle containing at least one atom from the group consisting of N, P, O and S and/or the organic radicals $R^{8C}$-$R^{17C}$ may also be substituted by halogens such as fluorine, chlorine or bromine. Furthermore, $R^{8C}$-$R^{17C}$ can be halogen such as fluorine, chlorine, bromine, amino $NR^{18C}_2$ or $N(SiR^{19C}_3)_2$, alkoxy or aryloxy $OR^{18C}$, for example dimethylamino, N-pyrrolidinyl, picolinyl, methoxy, ethoxy or isopropoxy. Possible radicals $R^{19C}$ in organosilicon substituents $SiR^{19C}_3$ are the same carboorganic radicals which have been mentioned above for $R^{1C}$-$R^{3C}$, where two radicals $R^{19C}$ may also be joined to form a 5- or 6-membered ring, e.g. trimethylsilyl, triethylsilyl, butyldimethylsilyl, tributylsilyl, tritert-butylsilyl, triallylsilyl, triphenylsilyl or dimethylphenylsilyl. These $SiR^{19C}_3$ radicals can also be bound via an oxygen or nitrogen, for example trimethylsilyloxy, triethylsilyloxy, butyldimethylsilyloxy, tributylsilyloxy or tritert-butylsilyloxy.

Preferred radicals $R^{12C}$-$R^{17C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, in particular hydrogen. In particular, $R^{13C}$ and $R^{16C}$ are each methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine or bromine and $R^{12C}$, $R^{14C}$, $R^{15C}$ and $R^{17C}$ are each hydrogen.

Preferred radicals $R^{9C}$ and $R^{11C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine. In particular, $R^{8C}$ and $R^{10C}$ are preferably a halogen such as fluorine, chlorine or bromine, particularly chlorine and $R^{9C}$ and $R^{11C}$ are each a $C_1$-$C_{22}$-alkyl which may also be substituted by halogens, in particular a $C_1$-$C_{22}$-n-alkyl which may also be substituted by halogens, e.g. methyl, trifluoromethyl, ethyl, n-propyl, n-butyl, n-pentyl, n-hexyl, n-heptyl, n-octyl, vinyl, or a halogen such as fluorine, chlorine or bromine. In another preferred combination $R^{8C}$ and $R^{10C}$ are a tertiary $C_1$-$C_{22}$-alkyl radical, particularly tert.butyl and $R^{9C}$ and $R^{11C}$ are each hydrogen or a halogen such as fluorine, chlorine or bromine.

In particular, $R^{12C}$, $R^{14C}$, $R^{15C}$ and $R^{17C}$ are identical, $R^{13C}$ and $R^{16C}$ identical, $R^{9C}$ and $R^{11C}$ are identical and $R^{8C}$ and $R^{10C}$ are identical. This is also preferred in the preferred embodiments described above.

The preparation of the compounds B) is described, for example, in J. Am. Chem. Soc. 120, p. 4049 ff. (1998), J. Chem. Soc., Chem. Commun. 1998, 849, and WO 98/27124. Preferred complexes B) are 2,6-Bis[1-(2-tert.butylphenylimino)ethyl]pyridine iron(II) dichloride, 2,6-Bis[1-(2-ter-t.butyl-6-chlorophenylimino)ethyl]pyridine iron(II) dichloride, 2,6-Bis[1-(2-chloro-6-methylphenylimino)ethyl]pyridine iron(II) dichloride, 2,6-Bis[1-(2,4-dichlorophenylimino)ethyl]pyridine iron(II) dichloride, 2,6-Bis[1-(2,6-dichlorophenylimino)ethyl]pyridine iron(II) dichloride, 2,6-Bis[1-(2,4-dichlorophenylimino)methyl]pyridine iron(II) dichloride, 2,6-Bis[1-(2,4-dichloro-6-methylphenylimino)ethyl]pyridine iron(II) dichloride-2,6-Bis[1-(2,4-difluorophenylimino)ethyl]pyridine iron(II) dichloride, 2,6-Bis[1-(2,4-dibromophenylimino)ethyl]pyridine iron(II) dichloride or the respective trichlorides, dibromides or tribromides.

In the following, reference to a transition metal complex (A) or catalyst (A) means a hafnocene (A). The molar ratio of transition metal complex A) to polymerization catalyst B) is usually in the range from 1:100 to 100:1, preferably from 1:10 to 10:1 and particularly preferably from 1:1 to 5:1. When a transition metal complex A) is used as sole catalyst under the same reaction conditions in the homopolymerization or copolymerization of ethylene, it preferably produces a higher Mw than does the complex (B) when it is used as sole complex under the same reaction conditions. The preferred embodiments of the complexes (A) and (B) are likewise preferred in combinations of the two complexes.

When a transition metal complex A) is used as sole catalyst under the same reaction conditions in the homopolymerization or copolymerization of ethylene, it preferably produces a higher Mw than does the complex (B) when it is used as sole complex under the same reaction conditions.

The catalyst composition of the invention can be used alone or together with further components as catalyst system for olefin polymerization. Furthermore, we have found catalyst systems for olefin polymerization comprising A) at least one polymerization catalyst based on a hafnocene (A),
B) at least one polymerization catalyst based on an iron component having a tridentate ligand bearing at least two aryl radicals with each bearing a halogen or tert.alkyl substituent in the ortho-position,
C) optionally one or more activating compounds,
D) optionally one or more organic or inorganic supports,
E) optionally one or more metal compounds of a metal of group 1, 2 or 13 of the Periodic Table.

The hafnocene (A) and/or the iron complex (B) sometimes have only a low polymerization activity and are then brought into contact with one or more activators, viz. the component (C), in order to be able to display a good polymerization activity. The catalyst system therefore optionally further comprises, as component (C) one or more activating compounds, preferably one or two activating compounds (C). The catalyst system of the invention preferably comprises one or more activators (C). Depending on the catalyst combinations (A) and (B), one or more activating compounds (C) are advantageous. The activation of the transition metal complex (A) and of the iron complex (B) of the catalyst composition can be carried out using the same activator or activator mixture or different activators. It is often advantageous to use the same activator (C) for both the catalysts (A) and (B).

The activator or activators (C) can in each case be used in any amounts based on the complexes (A) and (B) of the catalyst composition of the invention. They are preferably used in an excess or in stoichiometric amounts, in each case based on the complex (A) or (B) which they activate. The amount of activating compound(s) to be used depends on the type of the activator (C). In general, the molar ratio of transition metal complex (A) to activating compound (C) can be from 1:0.1 to 1:10000, preferably from 1:1 to 1:2000. The molar ratio of iron complex (B) to activating compound (C) is also usually in the range from 1:0.1 to 1:10000, preferably from 1:1 to 1:2000.

Suitable compounds (C) which are able to react with the transition metal complex (A) or the iron complex (B) to convert it into a catalytically active or more active compound are, for example, compounds such as an aluminoxane, a strong uncharged Lewis acid, an ionic compound having a Lewis-acid cation or an ionic compound containing a Brönsted acid as cation.

As aluminoxanes, it is possible to use, for example, the compounds described in WO 00/31090. Particularly useful aluminoxanes are open-chain or cyclic aluminoxane compounds of the general formula (X) or (XI)

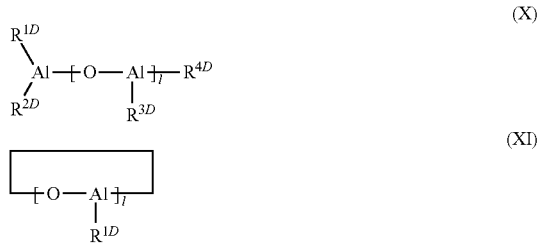

where $R^{1D}$-$R^{4D}$ are each, independently of one another, a $C_1$-$C_6$-alkyl group, preferably a methyl, ethyl, butyl or isobutyl group and I is an integer from 1 to 40, preferably from 4 to 25.

A particularly useful aluminoxane compound is methylaluminoxane.

These oligomeric aluminoxane compounds are usually prepared by controlled reaction of a solution of a trialkylaluminum, in particular trimethylaluminum, with water. In general, the oligomeric aluminoxane compounds obtained are in the form of mixtures of both linear and cyclic chain molecules of various lengths, so that I is to be regarded as a mean. The aluminoxane compounds can also be present in admixture with other metal alkyls, usually aluminum alkyls. Aluminoxane preparations suitable as component (C) are commercially available.

Furthermore modified aluminoxanes in which some of the hydrocarbon radicals have been replaced by hydrogen atoms or alkoxy, aryloxy, siloxy or amide radicals can also be used in place of the aluminoxane compounds of the formula (X) or (XI) as component (C).

It has been found to be advantageous to use the transition metal complex A) or the iron complex B) and the aluminoxane compounds in such amounts that the atomic ratio of aluminum from the aluminoxane compounds including any aluminum alkyl still present to the transition metal from the transition metal complex (A) is in the range from 1:1 to 2000:1, preferably from 10:1 to 500:1 and in particular in the range from 20:1 to 400:1. The atomic ratio of aluminum from the aluminoxane compounds including any aluminum alkyl still present to the iron from the iron complex (B) is usually in the range from 1:1 to 2000:1, preferably from 10:1 to 500:1 and in particular in the range from 20:1 to 400:1.

A further class of suitable activating components (C) are hydroxyaluminoxanes. These can be prepared, for example, by addition of from 0.5 to 1.2 equivalents of water, preferably from 0.8 to 1.2 equivalents of water, per equivalent of aluminum to an alkylaluminum compound, in particular triisobutylaluminum, at low temperatures, usually below 0° C. Such compounds and their use in olefin polymerization are described, for example, in WO 00/24787. The atomic ratio of aluminum from the hydroxyaluminoxane compound to the transition metal from the transition metal complex (A) or the iron complex (B) is usually in the range from 1:1 to 100:1, preferably from 10:1 to 50:1 and in particular in the range from 20:1 to 40:1. Preference is given to using a hafnocene dialkyl compound (A).

As strong, uncharged Lewis acids, preference is given to compounds of the general formula (XII)

where $M^{2D}$ is an element of group 13 of the Periodic Table of the Elements, in particular B, Al or Ga, preferably B, $X^{1D}$, $X^{2D}$ and $X^{3D}$ are each hydrogen, $C_1$-$C_{10}$-alkyl, $C_6$-$C_{15}$-aryl, alkylaryl, arylalkyl, haloalkyl or haloaryl each having from 1 to 10 carbon atoms in the alkyl part and from 6 to 20 carbon atoms in the aryl part or fluorine, chlorine, bromine or iodine, in particular haloaryls, preferably pentafluorophenyl.

Further examples of strong, uncharged Lewis acids are given in WO 00/31090.

Compounds which are particularly useful as component (C) are boranes and boroxins such as trialkylborane, triarylborane or trimethylboroxin. Particular preference is given to using boranes which bear at least two perfluorinated aryl radicals. Particular preference is given to compounds of the general formula (XII) in which $X^{1D}$, $X^{2D}$ and $X^{3D}$ are identical, for example triphenylborane, tris(4-fluorophenyl)borane, tris(3,5-difluorophenyl)borane, tris(4-fluoromethylphenyl)borane, tris(pentafluorophenyl)borane, tris(tolyl)borane, tris(3,5-dimethylphenyl)borane, tris(3,5-difluorophenyl)borane or tris(3,4,5-trifluorophenyl)borane. Preference is given to using tris(pentafluorophenyl)borane.

Suitable compounds (C) are preferably prepared by reaction of aluminum or boron compounds of the formula (XII) with water, alcohols, phenol derivatives, thiophenol derivatives or aniline derivatives, with halogenated and especially perfluorinated alcohols and phenols being of particular importance. Examples of particularly useful compounds are pentafluorophenol, 1,1-bis(pentafluorophenyl)methanol and 4-hydroxy-2,2',3,3',4',5,5',6,6'-nonafluorobiphenyl.

Examples of combinations of compounds of the formula (XII) with Broenstedt acids are, in particular, trimethylaluminum/pentafluorophenol, trimethylaluminum/1-bis(pentafluorophenyl)methanol, trimethylaluminum/4-hydroxy-2, 2',3,3',4',5,5',6,6'-nonafluorobiphenyl, triethylaluminum/pentafluorophenol and triisobutylaluminum/pentafluorophenol and triethylaluminum/4,4'-dihydroxy-2, 2',3,3',5,5',6,6'-octafluorobiphenyl hydrate.

In further suitable aluminum and boron compounds of the formula (XII), $R^{1D}$ is an OH group, such as, for example, in boronic acids and borinic acids. Particular mention may be made of borinic acids having perfluorinated aryl radicals, for example $(C_6F_5)_2BOH$.

Strong uncharged Lewis acids suitable as activating compounds (C) also include the reaction products of the reaction of a boronic acid with two equivalents of an aluminum trialkyl or the reaction products of the reaction of an aluminum trialkyl with two equivalents of an acidic fluorinated, in particular perfluorinated, carbon compound such as pentafluorophenol or bis(pentafluorophenyl)borinic acid.

Suitable ionic compounds having Lewis-acid cations include salt-like compounds of the cation of the general formula (XIII)

$$[((M^{3D})^{a+})Q_1Q_2\ldots Q_z]^{d+} \quad (XIII)$$

where $M^{3D}$ is an element of groups 1 to 16 of the Periodic Table of the Elements, $Q_1$ to $Q_z$ are simply negatively charged radicals such as $C_1$-$C_{28}$-alkyl, $C_6$-$C_{15}$-aryl, alkyl-aryl, arylalkyl, haloalkyl, haloaryl each having from 6 to 20 carbon atoms in the aryl part and from 1 to 28 carbon atoms in the alkyl part, $C_3$-$C_{10}$-cycloalkyl which may bear $C_1$-$C_{10}$-alkyl groups as substituents, halogen, $C_1$-$C_{28}$-alkoxy, $C_6$-$C_{15}$-aryloxy, silyl or mercaptyl groups, a is an integer from 1 to 6 and z is an integer from 0 to 5, d corresponds to the difference a-z, but d is greater than or equal to 1.

Particularly useful cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinating counterions, in particular boron compounds as are also mentioned in WO 91/09882, preferably tetrakis(pentafluorophenyl)borate.

Salts having noncoordinating anions can also be prepared by combining a boron or aluminum compound, e.g. an aluminum alkyl, with a second compound which can react to link two or more boron or aluminum atoms, e.g. water, and a third compound which forms with the boron or aluminium compound an ionizing ionic compound, e.g. triphenylchloromethane, or optionally a base, preferably an organic nitrogen-containing base, for example an amine, an aniline derivative or a nitrogen heterocycle. In addition, a fourth compound which likewise reacts with the boron or aluminum compound, e.g. pentafluorophenol, can be added.

Ionic compounds containing Brönsted acids as cations preferably likewise have noncoordinating counterions. As Brönsted acid, particular preference is given to protonated amine or aniline derivatives. Preferred cations are N,N-dimethylanilinium, N,N-dimethylcyclohexylammonium and N,N-dimethylbenzylammonium and also derivatives of the latter two.

Compounds containing anionic boron heterocycles as are described in WO 9736937 are also suitable as component (C), in particular dimethylanilinium boratabenzenes or trityl boratabenzenes.

Preferred ionic compounds C) contain borates which bear at least two perfluorinated aryl radicals. Particular preference is given to N,N-dimethylanilinium tetrakis(pentafluorophenyl)borate and in particular N,N-dimethylcyclohexylammonium tetrakis(pentafluorophenyl)borate, N,N-dimethylbenzylammonium tetrakis(pentafluorophenyl)borate or trityl tetrakispentafluorophenylborate.

It is also possible for two or more borate anions to be joined to one another, as in the dianion $[(C_6F_5)_2B-C_6F_4-B(C_6F_5)_2]^{2-}$, or the borate anion can be bound via a bridge to a suitable functional group on the support surface.

Further suitable activating compounds (C) are listed in WO 00/31090.

The amount of strong, uncharged Lewis acids, ionic compounds having Lewis-acid cations or ionic compounds containing Brönsted acids as cations is preferably from 0.1 to 20 equivalents, more preferably from 1 to 10 equivalents and particularly preferably from 1 to 2 equivalents, based on the transition metal complex (A) or the iron complex (B).

Suitable activating compounds (C) also include boron-aluminum compounds such as di[bis(pentafluorophenylboroxy)]methylalane. Examples of such boron-aluminum compounds are those disclosed in WO 99/06414.

It is also possible to use mixtures of all the abovementioned activating compounds (C). Preferred mixtures comprise aluminoxanes, in particular methylaluminoxane, and an ionic compound, in particular one containing the tetrakis(pentafluorophenyl)borate anion, and/or a strong uncharged Lewis acid, in particular tris(pentafluorophenyl)borane or a boroxin.

Both the transition metal complex (A) or the iron complex (B) and the activating compounds (C) are preferably used in a solvent, preferably an aromatic hydrocarbon having from 6 to 20 carbon atoms, in particular xylenes, toluene, pentane, hexane, heptane or a mixture thereof.

A further possibility is to use an activating compound (C) which can simultaneously be employed as support (D). Such systems are obtained, for example, from an inorganic oxide treated with zirconium alkoxide and subsequent chlorination, e.g. by means of carbon tetrachloride. The preparation of such systems is described, for example, in WO 01/41920.

Combinations of the preferred embodiments of (C) with the preferred embodiments of (A) and/or (B) are particularly preferred.

As joint activator (C) for the catalyst component (A) and (B), preference is given to using an aluminoxane. Preference is also given to the combination of salt-like compounds of the cation of the general formula (XIII), in particular N,N-dimethylanilinium tetrakis(pentafluorophenyl)borate, N,N-dimethylcyclohexylammonium tetrakis(pentafluorophenyl)borate, N,N-dimethylbenzylammonium tetrakis(pentafluorophenyl)borate or trityl tetrakispentafluorophenylborate, as activator (C) for hafnocenes (A), in particular in combination with an aluminoxane as activator (C) for the iron complex (B).

Further particularly useful joint activators (C) are the reaction products of aluminum compounds of the formula (XII) with perfluorinated alcohols and phenols.

To enable the transition metal complex (A) and the iron complex (B) to be used in polymerization processes in the gas phase or in suspension, it is often advantageous to use the complexes in the form of a solid, i.e. for them to be applied to a solid support (D). Furthermore, the supported complexes have a high productivity. The transition metal complexes (A) and/or the iron complex (B) can therefore also optionally be immobilized on an organic or inorganic support (D) and be used in supported form in the polymerization. This enables, for example, deposits in the reactor to be avoided and the polymer morphology to be controlled. As support materials, preference is given to using silica gel, magnesium chloride, aluminum oxide, mesoporous materials, aluminosilicates, hydrotalcites and organic polymers such as polyethylene, polypropylene, polystyrene, polytetrafluoroethylene or polymers bearing polar functional groups, for example copolymers of ethene and acrylic esters, acrolein or vinyl acetate.

Particular preference is given to a catalyst system comprising at least one transition metal complex (A), at least one iron complex (B), at least one activating compound (C) and at least one support component (D).

The preferred catalyst composition according to the invention comprises one or more support components. It is possible for both the transition metal component (A) and the iron complex (B) to be supported, or only one of the two components can be supported. In a preferred embodiment, both the components (A) and (B) are supported. The two components (A) and (B) can in this case be applied to different supports or together on a joint support. The components (A) and (B) are preferably applied to a joint support in order to ensure a relatively close spatial proximity of the various catalyst centers and thus to ensure good mixing of the different polymers formed.

To prepare the catalyst systems of the invention, preference is given to immobilizing one of the components (A) and one of the components (B) and/or activator (C) or the support (D) by physisorption or else by means of a chemical reaction, i.e. covalent binding of the components, with reactive groups on the support surface.

The order in which support component D), transition metal complex (A), iron complex (B) and the activating compounds (C) are combined is in principle immaterial. After the individual process steps, the various intermediates can be washed with suitable inert solvents such as aliphatic or aromatic hydrocarbons.

Transition metal complex (A), iron complex (B) and the activating compound (C) can be immobilized independently of one another, e.g. in succession or simultaneously. Thus, the support component (D) can firstly be brought into contact with the activating compound or compounds (C) or the support component (D) can firstly be brought into contact with the transition metal complex (A) and/or the iron complex (B). Preactivation of the transition metal complex A) by means of one or more activating compounds (C) prior to mixing with the support (D) is also possible. The iron component can, for example, be reacted simultaneously with the transition metal complex with the activating compound (C), or can be preactivated separately by means of the latter. The preactivated iron complex (B) can be applied to the support before or after the preactivated transition metal complex (A). In one possible embodiment, the transition metal complex (A) and/or the iron complex (B) can also be prepared in the presence of the support material. A further method of immobilization is pre-polymerization of the catalyst system with or without prior application to a support.

The immobilization is generally carried out in an inert solvent which can be removed by filtration or evaporation after the immobilization. After the individual process steps, the solid can be washed with suitably inert solvents such as aliphatic or aromatic hydrocarbons and dried. However, the use of the still moist, supported catalyst is also possible.

In a preferred method of preparing the supported catalyst system, at least one iron complex (B) is brought into contact with an activated compound (C) and subsequently mixed with the dehydrated or passivated support material (D). The transition metal complex (A) is likewise brought into contact with at least one activating compound (C) in a suitable solvent, preferably giving a soluble reaction product, an adduct or a mixture. The preparation obtained in this way is then mixed with the immobilized iron complex, which is used directly or after the solvent has been separated off, and the solvent is completely or partly removed. The resulting supported catalyst system is preferably dried to ensure that all or most of the solvent is removed from the pores of the support material. The supported catalyst is preferably obtained as a free-flowing powder. Examples of the industrial implementation of the above process are described in WO 96/00243, WO 98/40419 or WO 00/05277. A further preferred embodiment comprises firstly producing the activating compound (C) on the support component (D) and subsequently bringing this supported compound into contact with the transition metal complex (A) and the iron complex (B).

As support component (D), preference is given to using finely divided supports which can be any organic or inorganic solid. In particular, the support component (D) can be a porous support such as talc, a sheet silicate such as montmorillonite, mica or an inorganic oxide or a finely divided polymer powder (e.g. polyolefin or a polymer having polar functional groups).

The support materials used preferably have a specific surface area in the range from 10 to 1000 $m^2/g$, a pore volume in the range from 0.1 to 5 ml/g and a mean particle size of from 1 to 500 µm. Preference is given to supports having a specific surface area in the range from 50 to 700 $m^2/g$, a pore volume in the range from 0.4 to 3.5 ml/g and a mean particle size in the range from 5 to 350 µm. Particular preference is given to supports having a specific surface area in the range from 200 to 550 $m^2/g$, a pore volume in the range from 0.5 to 3.0 ml/g and a mean particle size of from 10 to 150 µm.

The transition metal complex (A) is preferably applied in such an amount that the concentration of the transition metal from the transition metal complex (A) in the finished catalyst system is from 1 to 200 µmol, preferably from 5 to 100 µmol and particularly preferably from 10 to 70 µmol, per g of support (D). The iron complex (B) is preferably applied in such an amount that the concentration of iron from the iron complex (B) in the finished catalyst system is from 1 to 200 µmol, preferably from 5 to 100 µmol and particularly preferably from 10 to 70 µmol, per g of support (D).

The inorganic support can be subjected to a thermal treatment, e.g. to remove adsorbed water. Such a drying treatment is generally carried out at temperatures in the range from 50 to 1000° C., preferably from 100 to 600° C., with drying at from 100 to 200° C. preferably being carried out under reduced pressure and/or under a blanket of inert gas (e.g. nitrogen), or the inorganic support can be calcined at temperatures of from 200 to 1000° C. to produce the desired structure of the solid and/or set the desired OH concentration on the surface. The support can also be treated chemically using customary dessicants such as metal alkyls preferably aluminum alkyls, chlorosilanes or $SiCl_4$, or else methylaluminoxane. Appropriate treatment methods are described, for example, in WO 00/31090.

The inorganic support material can also be chemically modified. For example, treatment of silica gel with $NH_4SiF_6$ or other fluorinating agents leads to fluorination of the silica gel surface, or treatment of silica gels with silanes containing nitrogen-, fluorine- or sulfur-containing groups leads to correspondingly modified silica gel surfaces.

Organic support materials such as finely divided polyolefin powders (e.g. polyethylene, polypropylene or polystyrene) can also be used and are preferably likewise freed of adhering moisture, solvent residues or other impurities by appropriate purification and drying operations before use. It is also possible to use functionalized polymer supports, e.g. ones based on polystyrene, polyethylene, polypropylene or polybutylene, via whose functional groups, for example ammonium or hydroxy groups, at least one of the catalyst components can be immobilized. It is also possible to use polymer blends.

Inorganic oxides suitable as support component (D) may be found among the oxides of elements of groups 2, 3, 4, 5, 13, 14, 15 and 16 of the Periodic Table of the Elements. Examples of oxides preferred as supports include silicon dioxide, aluminum oxide and mixed oxides of the elements calcium, aluminum, silicon, magnesium or titanium and also corresponding oxide mixtures. Other inorganic oxides which can be used alone or in combination with the abovementioned preferred oxidic supports are, for example, MgO, CaO, $AlPO_4$, $ZrO_2$, $TiO_2$, $B_2O_3$ or mixtures thereof.

Further preferred inorganic support materials are inorganic halides such as $MgCl_2$ or carbonates such as $Na_2CO_3$, $K_2CO_3$, $CaCO_3$, $MgCO_3$, sulfates such as $Na_2SO_4$, $Al_2(SO_4)_3$, $BaSO_4$, nitrates such as $KNO_3$, $Mg(NO_3)_2$ or $Al(NO_3)_3$.

As solid support materials (D) for catalysts for olefin polymerization, preference is given to using silica gels since particles whose size and structure make them suitable as supports for olefin polymerization can be produced from this material. Spray-dried silica gels, which are spherical agglomerates of relatively small granular particles, i.e. primary particles, have been found to be particularly useful. The silica gels can be dried and/or calcined before use.

Further preferred supports (D) are hydrotalcites and calcined hydrotalcites. In mineralogy, hydrotalcite is a natural mineral having the ideal formula $$Mg_6Al_2(OH)_{16}CO_3 \cdot 4H_2O$$

whose structure is derived from that of brucite $Mg(OH)_2$. Brucite crystallizes in a sheet structure with the metal ions in octahederal holes between two layers of close-packed hydroxyl ions, with only every second layer of the octahederal holes being occupied. In hydrotalcite, some magnesium ions are replaced by aluminum ions, as a result of which the packet of layers gains a positive charge. This is balanced by the anions which are located together with water of crystallization in the layers in-between.

Such sheet structures are found not only in magnesium-aluminum-hydroxides, but generally in mixed metal hydroxides of the general formula $$M(II)_{2x}^{2+}M(III)_2^{3+}(OH)_{4x+4} \cdot A_{2/n}^{n-} \cdot zH_2O$$

which have a sheet structure and in which M(II) is a divalent metal such as Mg, Zn, Cu, Ni, Co, Mn, Ca and/or Fe and M(III) is a trivalent metal such as Al, Fe, Co, Mn, La, Ce and/or Cr, x is a number from 0.5 to 10 in steps of 0.5, A is an interstitial anion and n is the charge on the interstitial anion which can be from 1 to 8, usually from 1 to 4, and z is an integer from 1 to 6, in particular from 2 to 4. Possible interstitial anions are organic anions such as alkoxide anions, alkyl ether sulfates, aryl ether sulfates or glycol ether sulfates, inorganic anions such as, in particular, carbonate, hydrogen carbonate, nitrate, chloride, sulfate or B(OH)-4⁻ or polyoxometal anions such as $Mo_7O_{24}^{6-}$ or $V_{10}O_{28}^{6-}$. However, a mixture of a plurality of such anions is also possible.

Accordingly, all such mixed metal hydroxides having a sheet structure should be regarded as hydrotalcites for the purposes of the present invention.

Calcined hydrotalcites can be prepared from hydrotalcites by calcination, i.e. heating, by means of which, inter alia, the desired hydroxide group content can be set. In addition, the crystal structure also changes. The preparation of the calcined hydrotalcites used according to the invention is usually carried out at temperatures above 180° C. Preference is given to calcination for a period of from 3 to 24 hours at temperatures of from 250° C. to 1000° C., in particular from 400° C. to 700° C. It is possible for air or inert gas to be passed over the solid or for a vacuum to be applied at the same time.

On heating, the natural or synthetic hydrotalcites firstly give off water, i.e. drying occurs. On further heating, the actual calcination, the metal hydroxides are converted into the metal oxides by elimination of hydroxyl groups and interstitial anions; OH groups or interstitial anions such as carbonate can also still be present in the calcined hydrotalcites. A measure of this is the loss on ignition. This is the weight loss experienced by a sample which is heated in two steps firstly for 30 minutes at 200° C. in a drying oven and then for 1 hour at 950° C. in a muffle furnace.

The calcined hydrotalcites used as component (D) are thus mixed oxides of the divalent and trivalent metals M(II) and M(III), with the molar ratio of M(II) to M(III) generally being in the range from 0.5 to 10, preferably from 0.75 to 8 and in particular from 1 to 4. Furthermore, normal amounts of impurities, for example Si, Fe, Na, Ca or Ti and also chlorides and sulfates, can also be present.

Preferred calcined hydrotalcites (D) are mixed oxides in which M(II) is magnesium and M(III) is aluminum. Such aluminum-magnesium mixed oxides are obtainable from Condea Chemie GmbH (now Sasol Chemie), Hamburg under the trade name Puralox Mg.

Preference is also given to calcined hydrotalcites in which the structural transformation is complete or virtually complete. Calcination, i.e. transformation of the structure, can be confirmed, for example, by means of X-ray diffraction patterns.

The hydrotalcites, calcined hydrotalcites or silica gels used are generally used as finely divided powders having a mean particle diameter D50 of from 5 to 200 preferably from 10 to 150 μm, particularly preferably from 15 to 100 μm and in particular from 20 to 70 and usually have pore volumes of from 0.1 to 10 cm³/g, preferably from 0.2 to 5 cm³/g, and specific surface areas of from 30 to 1000 m²/g, preferably from 50 to 800 m²/g and in particular from 100 to 600 m²/g. The transition metal complex (A) is preferably applied in such an amount that the concentration of the transition metal from the transition metal complex (A) in the finished catalyst system is from 1 to 100 preferably from 5 to 80 μmol and particularly preferably from 10 to 60 μmol, per g of support (D).

The catalyst system may further comprise, as additional component (E), a metal compound of the general formula (XX), $$M^G(R^{1G})_{r^G}(R^{2G})_{s^G}(R^{3G})_{t^G} \qquad (XX)$$

where
M$^G$ is Li, Na, K, Be, Mg, Ca, Sr, Ba, boron, aluminum, gallium, indium, thallium, zinc, in particular Li, Na, K, Mg, boron, aluminum or Zn,
R$^{1G}$ is hydrogen, $C_1$-$C_{10}$-alkyl, $C_6$-$C_{15}$-aryl, alkylaryl or arylalkyl each having from 1 to 10 carbon atoms in the alkyl part and from 6 to 20 carbon atoms in the aryl part,
R$^{2G}$ and R$^{3G}$ are each hydrogen, halogen, $C_1$-$C_{10}$-alkyl, $C_6$-$C_{15}$-aryl, alkylaryl, arylalkyl or alkoxy each having from 1 to 20 carbon atoms in the alkyl part and from 6 to 20 carbon atoms in the aryl part, or alkoxy together with $C_1$-$C_{10}$-alkyl or $C_6$-$C_{15}$-aryl,
r$^G$ is an integer from 1 to 3
and
s$^G$ and t$^G$ are integers from 0 to 2, with the sum r$^G$+s$^G$+t$^G$ corresponding to the valence of M$^G$,
where the component (E) is usually not identical to the component (C). It is also possible to use mixtures of various metal compounds of the formula (XX).

Among the metal compounds of the general formula (XX), preference is given to those in which
M$^G$ is lithium, magnesium, boron or aluminum and
R$^{1G}$ is $C_1$-$C_{20}$-alkyl.

Particularly preferred metal compounds of the formula (XX) are methyllithium, ethyllithium, n-butyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium, n-butyl-n-octylmagnesium, n-butyl-n- heptylmagnesium, in particular n-butyl-n-octylmagnesium, tri-n-hexylaluminum, triisobutylaluminum, tri-n-butylaluminum, triethylaluminum, dimethylaluminum chloride, dimethylaluminum fluoride, methylaluminum dichloride, methylaluminum sesquichloride, diethylaluminum chloride and trimethylaluminum and mixtures thereof. The partial hydrolysis products of aluminum alkyls with alcohols can also be used.

When a metal compound (E) is used, it is preferably present in the catalyst system in such an amount that the molar ratio of $M^G$ from formula (XX) to the sum of the transition metals from the transition metal complex (A) and the iron complex (B) is from 3000:1 to 0.1:1, preferably from 800:1 to 0.2:1 and particularly preferably from 100:1 to 1:1.

In general, the metal compound (E) of the general formula (XX) is used as constituent of a catalyst system for the polymerization or copolymerization of olefins. Here, the metal compound (E) can, for example, be used for preparing a catalyst solid comprising the support (D) and/or be added during or shortly before the polymerization. The metal compounds (E) used can be identical or different. It is also possible, particularly when the catalyst solid contains no activating component (C), for the catalyst system to further comprise, in addition to the catalyst solid, one or more activating compounds (C) which are identical to or different from any compounds (E) present in the catalyst solid.

The component E can likewise be reacted in any order with the components (A), (B) and optionally (C) and (D). The component (A) can, for example, be brought into contact with the component(s) (C) and/or (D) either before or after being brought into contact with the olefins to be polymerized. Preactivation by means of one or more components (C) prior to mixing with the olefin and further addition of the same or another component (C) and/or (D) after this mixture has been brought into contact with the olefin is also possible. Preactivation is generally carried out at temperatures of 10-100° C., preferably 20-80° C.

In another preferred embodiment, a catalyst solid is prepared from the components (A), (B), (C) and (D) as described above and this is brought into contact with the component (E) during, at the commencement of or shortly before the polymerization.

Preference is given to firstly bringing (E) into contact with the α-olefin to be polymerized and subsequently adding the catalyst solid comprising the components (A), (B), (C) and (D) as described above.

In a further, preferred embodiment, the support (D) is firstly brought into contact with the component (E), and the components (A) and (B) and any further activator (C) are then dealt with as described above.

It is also possible for the catalyst system firstly to be prepolymerized with α-olefins, preferably linear $C_2$-$C_{10}$-1-alkenes and in particular ethylene or propylene, and the resulting prepolymerized catalyst solid then to be used in the actual polymerization. The mass ratio of catalyst solid used in the prepolymerization to a monomer polymerized onto it is usually in the range from 1:0.1 to 1:1000, preferably from 1:1 to 1:200.

Furthermore, a small amount of an olefin, preferably an α-olefin, for example vinylcyclohexane, styrene or phenyldimethylvinylsilane, as modifying component, an antistatic or a suitable inert compound such as a wax or oil can be added as additive during or after the preparation of the catalyst system. The molar ratio of additives to the sum of transition metal compound (A) and iron complex (B) is usually from 1:1000 to 1000:1, preferably from 1:5 to 20:1.

The catalyst composition or catalyst system of the invention is suitable for preparing the polyethylene of the invention, which has advantageous use and processing properties.

To prepare the polyethylene of the invention, the ethylene is polymerized as described above with 1-alkenes having from 3 to 10 carbon atoms.

In the copolymerization process of the invention, ethylene is polymerized with 1-alkenes having from 3 to 12 carbon atoms. Preferred 1-alkenes are linear or branched $C_2$-$C_{10}$-1-alkenes, in particular linear $C_2$-$C_8$-1-alkenes such as ethene, propene, 1-butene, 1-pentene, 1-hexene, 1-heptene, 1-octene or branched $C_2$-$C_{10}$-1-alkenes such as 4-methyl-1-pentene. Particularly preferred 1-alkenes are $C_4$-$C_{10}$-1-alkenes, in particular linear $C_6$-$C_{10}$-1-alkenes. It is also possible to polymerize mixtures of various 1-alkenes. Preference is given to polymerizing at least one 1-alkene selected from the group consisting of ethene, propene, 1-butene, 1-pentene, 1-hexene, 1-heptene, 1-octene and 1-decene. Monomer mixtures containing at least 50 mol % of ethene are preferably used.

The process of the invention for polymerizing ethylene with 1-alkenes can be carried out using all industrially known polymerization methods at temperatures in the range from −60 to 350° C., preferably from 0 to 200° C. and particularly preferably from 25 to 150° C., and under pressures of from 0.5 to 4000 bar, preferably from 1 to 100 bar and particularly preferably from 3 to 40 bar. The polymerization can be carried out in a known manner in bulk, in suspension, in the gas phase or in a supercritical medium in the customary reactors used for the polymerization of olefins. It can be carried out batchwise or preferably continuously in one or more stages. High-pressure polymerization processes in tube reactors or autoclaves, solution processes, suspension processes, stirred gas-phase processes and gas-phase fluidized-bed processes are all possible.

The polymerizations are usually carried out at temperatures in the range from −60 to 350° C., preferably in the range from 20 to 300° C., and under pressures of from 0.5 to 4000 bar. The mean residence times are usually from 0.5 to 5 hours, preferably from 0.5 to 3 hours. The advantageous pressure and temperature ranges for carrying out the polymerizations usually depend on the polymerization method. In the case of high-pressure polymerization processes, which are customarily carried out at pressures of from 1000 to 4000 bar, in particular from 2000 to 3500 bar, high polymerization temperatures are generally also set. Advantageous temperature ranges for these high-pressure polymerization processes are from 200 to 320° C., in particular from 220 to 290° C. In the case of low-pressure polymerization processes, it is usual to set a temperature which is at least a few degrees below the softening temperature of the polymer. In particular, temperatures of from 50 to 180° C., preferably from 70 to 120° C., are set in these polymerization processes. In the case of suspension polymerizations, the polymerization is usually carried out in a suspension medium, preferably an inert hydrocarbon such as isobutane or mixtures of hydrocarbons or else in the monomers themselves. The polymerization temperatures are generally in the range from −20 to 115° C., and the pressure is generally in the range from 1 to 100 bar. The solids content of the suspension is generally in the range from 10 to 80%. The polymerization can be carried out either batchwise, e.g. in stirring autoclaves, or continuously, e.g. in tube reactors, preferably in loop reactors. Particular preference is given to employing the Phillips PF process as described in U.S. Pat. No. 3,242,150 and U.S. Pat. No. 3,248,179. The gas-phase polymerization is generally carried out in the range from 30 to 125° C. at pressures of from 1 to 50 bar.

Among the abovementioned polymerization processes, particular preference is given to gas-phase polymerization, in particular in gas-phase fluidized-bed reactors, solution polymerization and suspension polymerization, in particular in loop reactors and stirred tank reactors. The gas-phase polymerization can also be carried out in the condensed or supercondensed mode, in which part of the circulating gas is cooled to below the dew point and is recirculated as a two-phase mixture to the reactor. Furthermore, it is possible to use a multizone reactor in which the two polymerization zones are linked to one another and the polymer is passed alternately through these two zones a number of times. The two zones can also have different polymerization conditions. Such a reactor is described, for example, in WO 97/04015. The different or identical polymerization processes can also, if desired, be connected in series so as to form a polymerization cascade, for example as in the Hostalen® process. A parallel reactor arrangement using two or more identical or different processes is also possible. Furthermore, molar mass regulators, for example hydrogen, or customary additives such as antistatics can also be used in the polymerizations. Hydrogen can especially be used to enhance the activity of the hafnocene (A). The hydrogen and increased temperature usually lead to lower z-average molar mass.

The polymerization is preferably carried out in a single reactor, in particular in a gas-phase reactor. The polymerization of ethylene with 1-alkenes having from 3 to 10 carbon atoms gives the polyethylene of the invention when the catalyst of the invention is used. The polyethylene powder obtained directly from the reactor displays a very high homogeneity, so that, unlike the case of cascade processes, subsequent extrusion is not necessary in order to obtain a homogeneous product.

The production of polymer blends by intimate mixing of individual components, for example by melt extrusion in an extruder or kneader (cf., for example, "Polymer Blends" in Ullmann's Encyclopedia of Industrial Chemistry, $6^{th}$ Edition, 1998, Electronic Release), is often accompanied by particular difficulties. The melt viscosities of the high and low molecular weight components of a bimodal polyethylene blend are extremely different. While the low molecular weight component is quite fluid at the customary temperatures of about 190-210° C. used for producing the blends, the high molecular weight component is only softened ("lentil soup"). Homogeneous mixing of the two components is therefore for very difficult. In addition, it is known that the high molecular weight component can easily be damaged as a result of thermal stress and by shear forces in the extruder, so that the properties of the blend are adversely affected. The mixing quality of such polyethylene blends is therefore often unsatisfactory.

The mixing quality of the polyethylene powder obtained directly from the reactor can be tested by assessing thin slices ("microtome sections") of a sample under an optical microscope. Inhomogenities show up in the form of specks or "white spots". The specs or "white spots" are predominantly high molecular weight, high-viscosity particles in a low-viscosity matrix (cf., for example, U. Burkhardt et al. in "Aufbereiten von Polymeren mit neuartigen Eigenschaften", VDI-Verlag, Düsseldorf 1995, p. 71). Such inclusions can reach a size of up to 300 µm, cause stress cracks and result in brittle failure of components. The better the mixing quality of a polymer, the fewer and smaller are these inclusions observed. The mixing quality of a polymer is determined quantitatively in accordance with ISO 13949. According to the measurement method, a microtome section is prepared from a sample of the polymer, the number and size of these inclusions are counted and a grade is determined for the mixing quality of the polymer according to a set assessment scheme. The mixing quality of the polyethylene of the invention, obtained directly from the reactor is preferably below 3.

The preparation of the polyethylene of the invention in the reactor reduces the energy consumption, requires no subsequent blending processes and makes simple control of the molecular weight distributions and the molecular weight fractions of the various polymers possible. In addition, good mixing of the polyethylene is achieved.

The following examples illustrate the invention without restricting the scope of the invention.

The measured values described were determined in the following way:

NMR samples were placed in tubes under inert gas and, if appropriate, melted. The solvent signals served as internal standard in the $^1$H- and $^{13}$C-NMR spectra and their chemical shift was converted into the values relative to TMS.

The vinyl group content is determined by means of IR in accordance with ASTM D 6248-98. The branches/1000 carbon atoms are determined by means of $^{13}$C-NMR, as described by James. C. Randall, JMS-REV. Macromol. Chem. Phys., C29 (2&3), 201-317 (1989), and are based on the total content of $CH_3$ groups/1000 carbon atoms. The side chains larger than $CH_3$ and especially ethyl, butyl and hexyl side chain branches/1000 carbon atoms are likewise determined in this way.

The degree of branching in the individual polymer fractions is determined by the method of Holtrup (W. Holtrup, Makromol. Chem. 178, 2335 (1977)) coupled with $^{13}$C-NMR.

The density [$g/cm^3$] was determined in accordance with ISO 1183.

The determination of the molar mass distributions and the means Mn, Mw, $M_z$ and Mw/Mn derived therefrom was carried out by means of high-temperature gel permeation chromatography on a WATERS 150 C using a method based on DIN 55672 and the following columns connected in series: 3× SHODEX AT 806 MS, 1× SHODEX UT 807 and 1× SHODEX AT-G under the following conditions: solvent: 1,2,4-trichlorobenzene (stabilized with 0.025% by weight of 2,6-di-tert-butyl-4-methylphenol), flow: 1 ml/min, 500 µl injection volume, temperature: 140° C. The columns were calibrated with polyethylene standards with molar masses of from 100 bis $10^7$ g/mol. The evaluation was carried out by using the Win-GPC software of Fa. HS-Entwicklungsgesellschaft für wissenschaftliche Hard- and Software mbH, Ober-Hilbersheim.

For the purposes of the present invention, the expression "HLMI" refers, as is generally known, to the "high load melt flow rate" and is always determined at 190° C. under a load of 21.6 kg (190° C./21.6 kg) in accordance with ISO 1133.

The haze was determined by ASTM D 1003-00 on a BYK Gardener Haze Guard Plus Device on at least 5 pieces of film 10×10 cm with a thickness of 50 µm. The dart drop was determined by ASTM D 1709 Method A on a film with a thickness of 50 µm. The clarity was determined by ASTM D 1746-03 on a BYK Gardener Haze Guard Plus Device, calibrated with calibration cell 77.5, on at least 5 pieces of film 10×10 cm with a thickness of 50 µm. The gloss 45° was determined by ASTM D 2457-03 on a gloss meter 45° with a vacuum plate for fixing the film, on at least 5 pieces of film with a thickness of 50 µm.

Abbreviations in the table below:

| Cat. | Catalyst |
|---|---|
| T(poly) | Polymerisation temperature |
| $M_w$ | Weight average molar mass |
| $M_n$ | Number average molar mass |
| $M_z$ | z-average molar mass |
| Density | Polymer density |
| Prod. | Productivity of the catalyst in g of polymer obtained per g of catalyst used per hour |
| total-CH3 | is the amount of CH3-groups per 1000C including end groups |
| —HC═CH2 | is the amount of vinyl groups |
| >C═CH2 | is the amount of vinylidene groups |

GPC % at molar mass 1 million g/mol. is the % by weight according to gel permeation chromatography below a molar mass of 1 million g/mol.

Bis(n-butylcyclopentadienyl)hafnium dichloride is commercially available from Crompton.

Preparation of the Individual Components 2,6-Bis[1-(2-tert.butylphenylimino)ethyl]pyridine was prepared as in example 6 of WO 98/27124 and 2,6-Bis[1-(2-tert.butylphenylimino)ethyl]pyridine iron(II) dichloride was prepared as in example 15 of WO 98/27124.

2,6-Bis[1-(2,4,6-trimethylphenylimino)ethyl]pyridine was prepared as in example 1 of WO 98/27124 and reacted in an analogous manner with iron(II) chloride to give 2,6-Bis[1-(2,4,6-trimethylphenylimino)ethyl]pyridine iron(II) dichloride, as likewise disclosed in WO 98/27124.

2,6-Bis[1-(2,4-dichloro-6-methylphenylimino)ethyl]pyridine iron(II) dichloride was prepared according to the method of Qian et al., Organometallics 2003, 22, 4312-4321. Here, 65.6 g of 2,6-diacetylpyridine (0.4 mol), 170 g of 2,4-dichloro-6-methylaniline (0.483 mol), 32 g of silica gel type 135 and 160 g of molecular sieves (4 Å) were stirred in 1500 ml of toluene at 80° C. for 5 hours and a further 32 g of silica gel type 135 and 160 g of molecular sieves (4 Å) were subsequently added. The mixture was stirred at 80° C. for a further 8 hours, the insoluble solid was filtered off and washed twice with toluene. The solvent was distilled off from the filtrate obtained in this way, the residue was admixed with 200 ml of methanol and subsequently stirred at 55° C. for 1 hour. The suspension formed in this way was filtered and the solid obtained was washed with methanol and freed of the solvent. This gave 95 g of 2,6-Bis[1-(2,4,6-trimethylphenylimino) ethyl]pyridine in 47% yield. The reaction with iron(II) chloride was carried out as described by Qian et al., Organometallics 2003, 22, 4312-4321.

Preparation of the Mixed Catalyst Systems

Example 1 a) Support Pretreatment

XPO-2107, a spray-dried silica gel from Grace, was baked at 600° C. for 6 hours and subsequently 252.2 g of the dried silica gel admixed with 164.5 ml of MAO (4.75 M in Toluol, 0.78 mol). The mixture was stirred for one hour, filtered, the solid washed with toluene and then died under reduced pressure.

b) Preparation of the Mixed Catalyst Systems

A mixture of 1.48 g (2.45 mmol) of 2,6-Bis[1-(2,4-dichloro-6-methylphenylimino)ethyl]pyridine iron(II) dichloride, 3.61 g (7.34 mmol) of bis(n-butylcyclopentadienyl)hafnium dichloride and 159.6 ml of MAO (4.75 M in toluene, 0.76 mol) was stirred at room temperature for 1 h and subsequently added while stirring to a suspension of 237.1 g of the pretreated support material a) in 800 ml of toluene. The mixture was stirred at room temperature for a further 3 hours, the resulting solid filtered off and washed with toluene. The solid was dried under reduced pressure until it was free-flowing. This gave 256.7 g of catalyst.

Example 2 a) Support Pretreatment

XPO-2107, a spray-dried silica gel from Grace, was baked at 600° C. for 6 hours.

b) Preparation of the Mixed Catalyst Systems

A mixture of 5.35 g (9.69 mmol) of 2,6-Bis[1-(2-tert.butylphenylimino)ethyl]pyridine iron(II) dichloride, 7.49 g (15.22 mmol) of bis(n-butylcyclopentadienyl)hafnium dichloride and 472 ml of MAO (4.75 M in toluene, 2.24 mol) was stirred at room temperature for 30 minutes and subsequently added while stirring to a suspension of 276.8 g of the pretreated support material a) during the course of 45 minutes ((Fe+Hf):Al=1:90). The solid was dried under reduced pressure until it was free-flowing. This gave 609 g of catalyst which still contained 31.5% by weight of solvent (based on the total weight and calculated on the basis of complete application of all components to the support).

Example 3 a) Support Pretreatment

XPO-2107, a spray-dried silica gel from Grace, was baked at 600° C. for 6 hours.

b) Preparation of the Mixed Catalyst Systems

A mixture of 1.6 g (2.89 mmol) of 2,6-Bis[1-(2-tert.butylphenylimino)ethyl]pyridine iron(II) dichloride, 2.05 g (3.71 mmol) of bis(n-butylcyclopentadienyl)hafnium dichloride and 194.5 ml of MAO (4.75 M in toluene, 0.924 mmol) was stirred at room temperature for 15 minutes and subsequently added while stirring to a suspension of 95.5 g of the pretreated support material a) ((Fe+Hf):Al=1:140) in 430 ml toluene. After 2 hours the suspension was filtrated and washed with 500 ml of toluene. The residual solid was dried under reduced pressure until it was free-flowing powder. The catalyst still contained 25.2% by weight of solvent (based on the total weight and calculated on the basis of complete application of all components to the support).

Comparative Example C1 a) Support Pretreatment

XPO-2107, a spray-dried silica gel from Grace, was baked at 600° C. for 6 hours.

b) Preparation of the Mixed Catalyst Systems

A mixture of 0.99 g (1.755 mmol) of 2,6-Bis[1-(2,4,6-trimethylphenylimino)ethyl]pyridine iron(II) dichloride, 3.69 g (7.5 mmol) of bis(n-butylcyclopentadienyl)hafnium dichloride and 203.8 ml of MAO (4.75 M in toluene, 0.968 mol) was stirred at room temperature for one hour and subsequently added while stirring to a suspension of 125 g of the pretreated support material a) ((Fe+Hf):Al=1:105). The mixture was stirred for another 2 h, the solvent removed under reduced pressure and then the solid dried under reduced pressure until it was free-flowing. The resulting catalyst still contained 38.9% by weight of solvent (based on the total weight and calculated on the basis of complete application of all components to the support).

Comparative Example C2 a) Support Pretreatment

XPO-2107, a spray-dried silica gel from Grace, was baked at 600° C. for 6 hours.

b) Preparation of the Mixed Catalyst Systems

A mixture of 5.6 g (11.39 mmol) of bis(n-butylcyclopentadienyl)hafnium dichloride and 297 ml of MAO (4.75 M in toluene, 1.41 mol) was stirred at room temperature for one hour and subsequently added while stirring to 228 g of the pretreated support material a) (Hf:Al=1:120). The mixture was stirred for another 20 minutes and dried under reduced pressure until it was free-flowing. The resulting catalyst still contained 33.3% by weight of solvent (based on the total weight and calculated on the basis of complete application of all components to the support). This gave 460 g free flowing catalyst.

Polymerization of the Catalysts

The polymerization was carried out in a fluidized-bed reactor having a diameter of 0.5 m. The reaction temperature, output and the composition of the reactor gas are reported in Table 1, and the pressure in the reactor was 20 bar. 0.1 g of triisobutylaluminum per hour were metered in each case. Catalysts employed were the catalysts from the examples. The properties of the polymers obtained are summarized in Table 2.

TABLE 1

Polymerization results

| Catalyst from Ex. | T(poly) [° C.] | Output [kg/h] | Ethylene [kg/h] | 1-Hexene [g/n] | $H_2$ [l/h] |
|---|---|---|---|---|---|
| 1 | 105 | 3.2 | 4 | 52 | 1.47 |
| 2 | 94 | 3.8 | 5 | 100 | 0.57 |
| 3 | 100 | 3.1 | 3.4 | 85 | 0.67 |
| C1 | 94 | 4.4 | 5.2 | 147 | 4.15 |
| C2 | 100 | 4.8 | 5.4 | 136 | 4.09 |

TABLE 2

| Catalyst from Example | 1 | 2 | 3 | C1 | C2 |
|---|---|---|---|---|---|
| Density [g/cm³] | 0.9434 | 0.9439 | 0.938 | 0.9413 | 0.935 |
| Etavis/EtaGPC | 0.895 | 0.885 | 0.895 | 0.988 | n.d. |
| Mw [g/mol] | 141769 | 126115 | 161781 | 240628 | 151049 |
| Mw/Mn | 8.12 | 13.23 | 12.44 | 9.07 | 3.7 |
| Mz | 396696 | 380177 | 485941 | 1339939 | 279249 |
| GPC % at molar mass 1 million | 99.392 | 99.529 | 98.948 | 95.406 | 99.896 |
| —HC=CH2 [1/1000 C.] | 0.75 | 1.91 | 1.2 | 0.34 | 0.07 |
| >C=CH2 [1/1000 C.] | 0.15 | 0.2 | 0.2 | 0.17 | 0.09 |
| total-CH3 [1/1000 C.] | 4.3 | 6.5 | 6.4 | 5 | 4.9 |
| Butyl side chains [1/1000 C.] | 2.67 | 3.83 | 4.67 | 4.17 | 2.7 |
| HLMI [g/10 min.] | 22 | 43 | 16 | 11 | 25 |

Granulation and Film Extrusion

The obtained polyethylenes were homogenised and granulated on a ZSK 30 (Werner Pfleiderer) with screw combination 8A. The processing temperature was 220° C., the screw speed 250/min with maximum output at 20 kg/h. 1500 ppm Irganox B215 were added to stabilize the polyethylenes.

The polymer was extruded into films by blown film extrusion on a Weber film extruder equipped with a collapsing device with wooden flatted boards.

The diameter of the ring die was 50 mm, the gap width was 2/50 and the angel in which the cooling air is blown onto the extruded film is 45°. No filters were used. The 25D Extruder with a screw diameter of 30 mm and a screw speed of 50 turns per min which is equivalent to an output of 5.1 kg/h. The blow-up ratio was 1:2 and eine the haul-off speed 4.9 m/10 min. The height of the frost line was 160 mm. Films with a thickness of 50 µm were obtained. The processing properties and optical and mechanical properties of the films are summarized in Table 3.

TABLE 3

Processing properties and optical and mechanical properties of the films

| Film from cat. of Ex. | 1 | 2 | 3 | C1 | C2 |
|---|---|---|---|---|---|
| melt temp. [° C.] | 240 | 225 | 230 | 241 | 228 |
| haze [%] | 13.9 | 19.9 | 10 | 75.2 | 22.7 |
| clarity [%] | 98.8 | 97.1 | 99 | 13.9 | 94.6 |
| gloss 45° | 60.4 | 49.6 | n.d. | 7 | 45 |
| DDI [g] | 124 | 162 | 330 | <60 | n.d. |

The invention claimed is:

1. A process for preparing ethylene copolymers having a molar mass distribution width $M_w/M_n$ of from 5 to 30, a density of from 0.92 to 0.955 g/cm³, a weight average molar mass $M_w$ of from 50,000 g/mol to 500,000 g/mol and has from 0.01 to 20 branches/1000 carbon atoms, a z-average molecular weight $M_z$ of less than 1 million g/mol, wherein 5-50% by weight of the polyethylene having the lowest molar masses has a degree of branching of less than 12 branches/1000 carbon atoms and 5-50% by weight of the polyethylene having the highest molar masses has a degree of branching of more than 1 branch/1000 carbon atoms, the process comprising polymerizing ethylene in the presence of 1-alkenes with 3 to 12 carbon atoms in the presence of a catalyst composition comprising at least two different polymerization catalysts, wherein A) is at least one polymerization catalyst based on a hafnocene (A), and B) is at least one polymerization catalyst based on an iron component having a tridentate ligand bearing at least two aryl radicals with each bearing a halogen or tertiary alkyl substituent in the ortho-position (B).

2. The process according to claim 1, wherein ethylene is copolymerized with at least one 1-alkene of formula $R^1CH=CH_2$, wherein $R^1$ is an alkyl radical with 1 to 10 carbons at a temperature of from 20 to 200° C. and a pressure of from 0.05 to 1 MPa.

3. The process according to claim 1, wherein the catalyst composition is a catalyst system comprising:
A) at least one polymerization catalyst based on a hafnocene (A);
B) at least one polymerization catalyst based on an iron component having a tridentate ligand bearing at least two aryl radicals with each bearing a halogen or tertiary alkyl substituent in the ortho-position (B);
C) optionally at least one activating compound;
D) optionally at least one organic or inorganic support; and
E) optionally at least one metal compound of a metal of group 1, 2 or 13 of the Periodic Table.

* * * * *